United States Patent
Bindschendler et al.

(10) Patent No.: US 11,718,703 B2
(45) Date of Patent: *Aug. 8, 2023

(54) RIGID FOAM WITH IMPROVED INSULATING POWER

(71) Applicants: TEREOS STARCH & SWEETENERS BELGIUM, Aalst (BE); CENTRE NATIONAL DE LA RECHERCHE SCIENTIFIQUE, Paris (FR); SOPREMA, Strasbourg (FR); UNIVERSITÉ DE STRASBOURG, Strasbourg (FR)

(72) Inventors: Pierre Etienne Bindschendler, Strasbourg (FR); Alexandru Sarbu, Strasbourg (FR); Rémi Perrin, Strasbourg (FR); Pierre Furtwengler, Paris (FR); Luc Avérous, Paris (FR); Andréas Redl, Moussy-le-Vieux (FR)

(73) Assignees: TEREOS STARCH & SWEETENERS BELGIUM, Aalst (BE); CENTRE NATIONAL DE LA RECHERCHE SCIENTIFIQUE, Paris (FR); SOPREMA, Strasbourg (FR); UNIVERSITE DE STRASBOURG, Strasbourg (FR)

( * ) Notice: Subject to any disclaimer, the term of this patent is extended or adjusted under 35 U.S.C. 154(b) by 290 days.

This patent is subject to a terminal disclaimer.

(21) Appl. No.: 16/963,347

(22) PCT Filed: Jan. 22, 2019

(86) PCT No.: PCT/EP2019/051491
§ 371 (c)(1),
(2) Date: Jul. 20, 2020

(87) PCT Pub. No.: WO2019/141868
PCT Pub. Date: Jul. 25, 2019

(65) Prior Publication Data
US 2021/0246254 A1     Aug. 12, 2021

(30) Foreign Application Priority Data

Jan. 22, 2018  (FR) ...................................... 1800072

(51) Int. Cl.
| | |
|---|---|
| *C08G 18/16* | (2006.01) |
| *C08G 18/42* | (2006.01) |
| *C08G 18/76* | (2006.01) |
| *C08J 9/14* | (2006.01) |

(52) U.S. Cl.
CPC ....... *C08G 18/163* (2013.01); *C08G 18/4241* (2013.01); *C08G 18/7664* (2013.01); *C08J 9/141* (2013.01); *C08G 2110/0025* (2021.01); *C08J 2203/14* (2013.01); *C08J 2205/10* (2013.01)

(58) Field of Classification Search
CPC ............. C08G 18/163; C08G 18/4241; C08G 18/7664; C08G 2110/0025; C08J 9/141; C08J 2203/14; C08J 2205/10
See application file for complete search history.

(56) References Cited

U.S. PATENT DOCUMENTS

| | | |
|---|---|---|
| 2,863,855 A | 12/1958 | Wilson et al. |
| 2,980,650 A | 4/1961 | Wilson et al. |
| 4,001,180 A | 1/1977 | Doyle et al. |
| 4,404,295 A | 9/1983 | Bernstein et al. |
| 5,057,546 A | 10/1991 | Sudan |
| 5,064,873 A * | 11/1991 | Snider .................... C08G 18/10 521/902 |
| 5,605,940 A | 2/1997 | Skowronski et al. |
| 11,180,605 B2 * | 11/2021 | Bindschedler .......... C07C 67/08 |
| 2006/0084709 A1 | 4/2006 | Dobransky |
| 2012/0142799 A1 | 6/2012 | Gehringer et al. |
| 2015/0218415 A1 | 8/2015 | Nixon et al. |
| 2015/0299373 A1 | 10/2015 | Nefzger et al. |

FOREIGN PATENT DOCUMENTS

| | | |
|---|---|---|
| EP | 2636694 A1 | 9/2013 |
| WO | 2018037371 A1 | 3/2018 |
| WO | 2018037376 A1 | 3/2018 |

OTHER PUBLICATIONS

International Search Report dated May 3, 2019 in corresponding International application No. PCT/EP2019/051491; 6 pages.

(Continued)

*Primary Examiner* — John M Cooney

(74) *Attorney, Agent, or Firm* — Maier & Maier, PLLC

(57) ABSTRACT

A rigid foam or composition allowing a rigid foam to be obtained made from polyurethane and/or polyisocyanurate. The rigid foam or composition includes polyols selected from polyester polyols and polyether polyols; the polyols include: 5 to 50% of a polyester polyol A by weight relative to the total weight of the polyols; and a polyol B selected from polyester polyols B and polyether polyols B. The polyester polyol A is of general formula Rx-Ry-Z-Ry'-Rx' in which Z is a C3 to C8 alcohol sugar chosen from glycerol, sorbitol, erythritol, xylitol, araditol, ribitol, dulcitol, mannitol and volemitol. Ry and Ry' are diesters of formula —OOC—Cn-COO— in which n is between 2 and 34, and Rx and Rx' are identical or different C2 to C12 monoalcohols.

21 Claims, 11 Drawing Sheets

(56) References Cited

OTHER PUBLICATIONS

Gustini, L. et al., "Enzymatic synthesis and preliminary evaluation as coating of sorbitol-based, hydroxy-functional polyesters with molecular weights", European Polymer Journal, vol. 67, Dec. 2014, pp. 459-475.
Gustini, L. et al., "Green and selective polycondensation methods toward linear sorbitol-based polyesters: enzymatic vs. organic and metal-based catalysis", ChemSusChem, Issue 9, Jul. 13, 2016, 14 total pages. Peer reviewed version.

\* cited by examiner

RIGID FOAM WITH IMPROVED INSULATING POWER

TECHNICAL FIELD

The present invention relates to a polyurethane and polyisocyanurate rigid foam with improved characteristics comprising at least two polyols of which one polyester polyol typically a biosourced polyester polyol.

TECHNICAL BACKGROUND

Polyurethanes (PU) are versatile polymers and are used in various applications such as automobile, furniture, construction, shoes, acoustic and thermal insulation with a global production of 18 Mt in 2016, placing PU in $6^{th}$ place among polymers based on the annual global production results.

Today, the PU industry is highly dependent on petrosourced components such as polyether polyols obtained by alkoxylation reaction or isocyanates obtained from phosgene or diphosgen chemistry. According to various laws, in particular the Kyoto protocol in Europe, it is now mandatory to reduce greenhouse gas emissions from production to the final use of a product. A highly illustrated example of this is the increasing attention given to thermal insulation of buildings (as buildings emit about 40% of the greenhouse gases at a global level), in particular the thermal insulation of buildings with a renewable material base coming from biomass (biosourced insulation). One of the best materials for the thermal insulation of buildings is the family of rigid polyurethane foams (PUR or PIR), based on the polyaddition of polyols and of polyisocyanates with high-functionality carrying 2 to 5 isocyanate groups in order to obtain rigid materials with closed cells. The thermal conductivity of PUR or PIR foams varies between 20 mW/(m×K) and 30 mW/(m×K) compared to 29 mW/(m×K) and 40 mW/(m×K) for expanded (EPS) or extruded (XPS) polystyrene or glass wool or 30 mW/(m×K) and 50 mW/(m×K) for mineral wools and fibrous insulation (such as wood fibres or flax fibres).

There is a difference in the composition between PUR foams and polyisocyanurate-polyurethane foams, commonly referred to as polyisocyanurate foams (PIR). PUR rigid foams are based on the reaction between the alcohol functions of polyols and polyisocyanates in the presence of a blowing agent. The hydroxyl functionality of the polyols used for PUR foams is substantially greater than 2 in order to have rigid foams. The PIR foams are based both on the alcohol-isocyanate reaction but also on the trimerisation of the polyisocyanates at high temperature into isocyanurate ring also called triisocyanuric rings (diagram 1) in the presence of a specific catalyst. The formulation of PIR foam is slightly different from the PUR foams. Excess isocyanate function is required in order to obtain tri-functional isocyanurate rings.

The polyol reacts with the polyisocyanate to form polyurethane. Then, the excess polyisocyanates trimerise into isocyanurate ring at the origin of the high cross-linking density of the final foam. The high cross-linking density of PIR foams constitutes their main disadvantage, as it induces friability in the material.

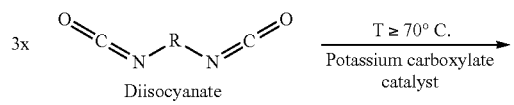
Diisocyanate

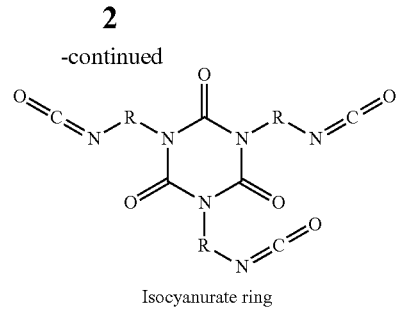
Isocyanurate ring

Diagram 1: Trimerisation of polyisocyanates in the presence of a potassium carboxylate catalyst Thus, a polyol with a hydroxyl functionality of about 2 can be used to carry out rigid foams.

The higher friability of PIR foams with respect to PUR foams is largely compensated by other superior properties with respect to PUR foams, in particular by the thermal resistance thereof. It has been established that the range of thermal stability of the urethane function depends on the chemical environment thereof and varies between 120° C. and 250° C. The range of thermal stability of the isocyanurate function also depends on the surrounding chemical function, but is estimated between 365° C. and 500° C. The best thermal stability of the isocyanurate functions present in the PIR foams is thus at the origin of their better fire resistance with respect to PUR foams. This increased fire resistance with good thermal resistance makes them truly attractive in the building insulation sector. The building and construction sectors face new increasingly drastic heat resistance and fire resistance standards regarding the materials used. Despite these superior properties, little research has been conducted on polyols for PIR rigid foams that are substituted for conventional petrosourced polyols. Recently, only rape oil, crude glycerol, castor oil, microalgae oils and tannin-based polyols were used in the PUR-PIR foam. Very little work has been carried out on the use of sorbitol in PIR rigid foams although the latter is widely used in polyether polyols for PUR rigid foams.

The properties of PIR foams are mainly linked to the morphology and internal structure thereof, which has a significant effect on the thermal conductivity and the mechanical properties. It is well established that the thermal properties of foam materials depend mainly on the content of closed cells and of the gas that they contain (H. Fleurent and S. Thijs, *J. Cell. Plast.*, 1995, 31, 580-599). It is also widely accepted that the mechanical properties of expanded materials depend closely on their bulk density. J. Mills has studied polyethylene and polystyrene foams with closed cells and has shown that the air included in the cells significantly contributed to the resistance to compression of foams with low bulk density (N. J. Mills, *J. Cell. Plast.*, 2011, 47, 173-197). However, the mechanical properties of the PIR foams are not very often studied. J. Andersons and the collaborators thereof have worked on partially biosourced polyisocyanurate foams, with low bulk density and with closed cells (J. Andersons et al., *Mater. Des.*, 2016, 92, 836-845). They studied the anisotropy of the resistance to compression of foams between the direction longitudinal and transverse to the rising of the foam. They have shown that the ratio between the Young's moduli and the force in the longitudinal direction and transverse direction were respectively about 3 and 1.4.

The applicant has already developed a new PIR foam prepared from biosourced products and more particularly from a biosourced polyester polyol in the replacement of petrosourced polyols used for the foams of the market in the conventional application thereof. The objective of the present invention is to propose a foam that is at least partially biosourced that has improved reactive, mechanical and physical properties with respect to prior mousses in terms of cell size, thermal degradation, reactivity, expansion profile, hardness, resistance to compression, bulk density or thermal conductivity.

SUMMARY

The present invention relates to a rigid foam or composition allowing a rigid foam to be obtained made from polyurethane and/or polyisocyanurate, said foam or composition comprising polyols selected from polyester polyols and polyether polyols; said polyols comprising:
from 5 to 50% of a polyester polyol A by weight relative to the total weight of the polyols; and a polyol B selected from polyester polyols B and polyether polyols B.

The polyester polyol A being of general formula Rx-Ry-Z-Ry'-Rx' wherein, Z is a C3 to C8 alcohol sugar selected from glycerol, sorbitol, erythritol, xylitol, araditol, ribitol, dulcitol, mannitol and volemitol, Ry and Ry' are diesters of formula —OOC—$C_n$—COO— with n comprised between 2 and 34, and Rx and Rx' are identical or different C2 to C12 monoalcohols.

Advantageously, the mass ratio of polyester polyol A over the polyol B is comprised between 5/95 and 50/50.

According to an embodiment, the polyester polyol A is obtained by:
a first polycondensation (a) of a C3 to C8 alcohol sugar Z, selected from glycerol, sorbitol, erythritol, xylitol, araditol, ribitol, dulcitol, mannitol and volemitol; and of two identical or different C4 to C36 diacids Y and Y' and
a second polycondensation (b) of the product obtained in (a) with two identical or different C2 to C12 diols X and X'.

In an embodiment, the diacids Y and Y' are independently selected from butanedioic acid, pentanedioic acid, hexanedioic acid, heptanedioic acid, octanedioic acid, nonanedioic acid, decanedioic acid, undecanedioic acid, dodecanedioic acid, tridecanedioic acid, tetradecanedioic acid, pentadecanedioic acid, hexadecanedioic acid and mixtures thereof.

In an embodiment, the diols X and X' are independently selected from 1,2-ethanediol, 1,3-propanediol, 1,4-butanediol, 1,6-hexanediol, 1,8-octanediol, 1,10-decanediol, 1,12-dodecanediol and mixtures thereof.

In an embodiment, the rigid foam or composition allowing a rigid foam to be obtained such as described hereinabove, has a cell size with a minimum diameter in the transverse direction comprised between 50 and 350 μm and/or a bulk density comprised between 22 to 60 kg/m³ and/or a measurement of the lower thermal conductivity coefficient comprised between 18 and 30 mW/(m×K) and/or said foam or the composition allowing such a foam to be obtained comprises 5 to 49% of a polyester polyol A by weight relative to the total weight of the polyol.

According to an embodiment, the polyester polyol A has a molecular weight comprised between 350 g/mol and 2,000 g/mol and/or a hydroxyl value from 300 to 900 mg KOH/g and/or a viscosity at 25° C. comprised from 4,000 to 25,000 mPa·s According to an embodiment, the foam has a cell size with a minimum diameter in the transverse direction comprised between 50 and 350 μm and/or a bulk density comprised between 22 and 60 kg/m³.

In a particular embodiment, said foam comprises at least one reaction catalyst, at least one blowing agent, a stabiliser, at least one polyisocyanate having a functionality at least equal to 2, optionally, a flame retardant.

In a particular embodiment, the foam is a polyisocyanate foam and comprises:
60 to 100 parts, preferably, from 70 to 100 parts even more preferably between 80 and 100 parts of polyols of which 5 to 50% typically 5 to 49% or 6 to 48% by weight of polyester polyol A such as described hereinabove on the weight of polyol,
100 to 700 parts, preferably, from 120 to 650 parts even more preferably between 150 and 575 parts of at least one polyisocyanate,
0.1 to 13 parts, preferably, from 0.5 to 12 parts even more preferably between 1 and 11 parts of at least one catalyst, preferably at least two catalysts, typically an amine catalyst and a potassium carboxylate,
0.5 to 80 parts, preferably, from 5 to 70 parts even more preferably between 10 and 60 parts of at least one blowing agent,
0.2 to 8 parts, preferably, from 1 to 7 parts even more preferably between 1.5 and 6 parts of a stabiliser
0 to 30 parts, preferably, from 5 to 25 parts even more preferably between 10 and 20 parts of a flame retardant.

In a particular embodiment, the foam is a polyurethane foam and comprises:
at least 1 to 100 parts, preferably, from 40 to 100 parts even more preferably between 80 to 100 parts of polyols of which 5 to 50%, preferably 5 to 49% or 6 to 48% of a polyester polyol A such as described hereinabove by weight relative to the total weight of the polyol,
150 to 500 parts, preferably, from 160 to 425 parts even more preferably between 180 and 375 parts of at least one polyisocyanate,
0.5 to 5 parts of at least one catalyst typically of an amine catalyst,
0.5 to 15 parts of at least one blowing agent typically, 0.5 to 12 parts, preferably, 0.6 to 10 parts, even more preferably, 0.7 to 9 parts of a chemical blowing agent such as water and/or 0 to 60 parts, preferably, 0.5 to 30 parts, even more preferably, 1 to 25 parts of a physical blowing agent,
0.2 to 5 parts of a stabiliser such as a polyether-polysiloxane copolymer, and
0 to 30 parts of a flame retardant.

According to an embodiment, the polyol B has a hydroxyl value comprised between 80 and 800 mg KOH/g and/or a functionality greater than or equal to 2, and/or a molar mass (Mn) comprised between 50 and 4,000 g/mol and/or an acid value less than 10 mg KOH/g and/or a viscosity less than 50,000 mPa·s at 25° C.

According to a particular embodiment, the constituents of the rigid foam or composition allowing a rigid foam to be obtained are selected as follows:
the at least one polyisocyanate is selected from toluene diisocyanate, 4,4'-diphenylmethane diisocyanate, polymethylene polyphenylene polyisocyanate and mixtures thereof; and/or
the at least one catalyst is selected from at least one tertiary amine, at least one potassium carboxylate and at least one triazine and mixtures thereof; preferably the at least one catalyst being selected from N, N-dimethylcyclohexylamine, bis(2-dimethylaminoethyl) ether, 1,3,5-tris(3-[dimethylamino] propyl)-hexahydro-s-triazine, potassium 2-ethylhexanoate and mixtures thereof; and/or the at least one blowing agent is selected from chemical blowing agents selected from water, formic acid, phthalic anhydride and acetic acid and/or physical blowing agents selected from pentane, isomers of pentane, hydrocarbons, hydrofluorocarbons, hydrochlorofluoroolefins, hydrofluoro-olefins, ethers and mixtures thereof; and/or the at least one stabiliser is selected from silicone glycol copolymers, non-hydrolysable silicone glycol copolymer, polyalkylene siloxane colpolymer, methylsiloxane polyoxyalkylene colpolymer, polyether-polysiloxane colpolymer, polydimethylsiloxane polyether copolymer, polyethersiloxane, a polyether-polysiloxane copolymer, a polysiloxane-polyoxyalkylene block copolymer or mixtures thereof; and/or the at least one flame retardant is selected from Tris (1-chloro-2-propyl) phosphate, triethylene phosphate, triaryl phosphate esters, ammonium polyphosphate, red phosphorus, trishalogenaryl, and mixtures thereof.

The invention further relates to a panel or a block of rigid foam comprising a rigid foam such as described hereinabove.

The invention also relates to a method of thermal or cryogenic insulation or a method for filling, waterproofing, sealing or improving the buoyancy of an object or of a building by the depositing or the introduction of rigid foam blocks or panels according to the invention or by the projection in situ of a rigid foam or of a composition allowing a rigid foam to be obtained as described hereinabove.

BRIEF DESCRIPTION OF THE FIGURES

FIG. 4: Cell diameters of PIR foam.

FIG. 6: FTIR spectra of foams.

DETAILED DESCRIPTION

Figure 1:
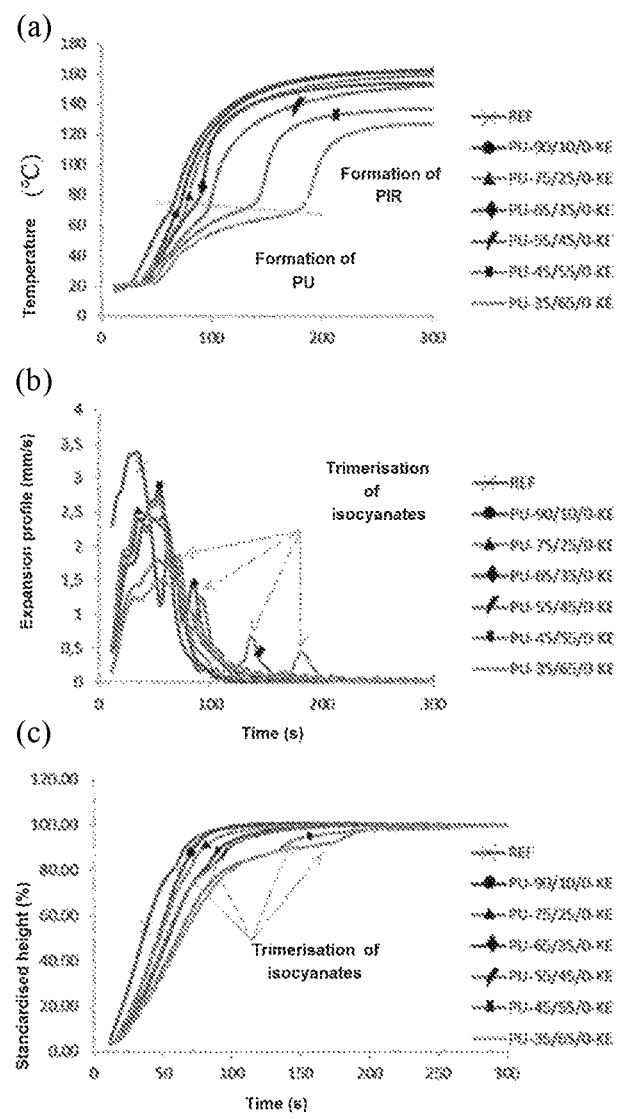
FIG. 1: Change in (a) the temperature, (b) expansion profile, (c) standardised height (H/Hmax) as a function of time during the PIR foams.

The invention relates to a rigid foam or composition allowing a rigid foam to be obtained comprising polyols among which a polyester polyol A, said foam having:
  i) a cell size with a minimum diameter in the transverse direction comprised between 40 and 400 μm, preferably between 50 and 350 μm, typically between 60 and 325 μm, and/or
  ii) a bulk density comprised between 20 to 80 kg/m$^3$ and/or
  iii) a measurement of the thermal conductivity coefficient less than 30 mW/(m×K) and/or
  iv) said foam or the composition allowing a such a foam to be obtained comprises 5 to 50% typically 5 to 49% of a polyester polyol A by weight relative to the total weight of the polyol preferably of polyester polyol and/or polyether polyol, said polyester polyol A being obtained by a first polycondensation (a) of a C3 to C8 alcohol sugar Z and of two identical or different C4 to C36 diacids Y and Y' and by a second polycondensation (b) of the product obtained in (a) with two identical or different C2 to C12 diols X and X', or said polyester polyol A being of general formula Rx-Ry-Z-Ry'-Rx' wherein, Z is a C3 to C8 alcohol sugar, Ry and Ry' are diesters of formula —OOC—C$_n$—COO— with n comprised between 2 and 34, and Rx and Rx' are identical or different C2 to C12 monoalcohols.

According to an embodiment, the polyester polyol A is of general formula Rx-Ry-Z-Ry'-Rx' wherein, Z is a C3 to C8 alcohol sugar, Ry and Ry' are diesters of formula —OOC—C$_n$—COO— with n comprised between 2 and 34, and Rx and Rx' are identical or different C2 to C12 monoalcohols.

According to an embodiment, the polyester polyol A is obtained by a first polycondensation (a) of a C3 to C8 alcohol sugar Z and of two identical or different C4 to C36 diacids Y and Y' and by a second polycondensation (b) of the product obtained in (a) with two identical or different C2 to C12 diols X and X'.

Typically, the term "foam" such as used for example in the expressions "polyurethane foam" or "polyisocyanurate foam", means a compound with a three-dimensional cell structure of the expanded type. Said foam can be rigid or flexible, with open or closed cells.

"Rigid foam" means a foam that has good resistance to compression and of which the internal structure is irreversibly damaged during a compression deformation comprised between 5 and 50%. Generally such foams have glass transition temperatures (Tg) greater than 70° C. often close to 200° C. In the present invention "rigid foams" means a foam that generally has a high content of closed cells, typically foams that have a closed cell content greater than 80%, even greater than 85% or 90% (for example from 80 to 100%). Calculating the closed cell content is known to those skilled in the art typically according to standards EN ISO4590 (October 2016) and ASTM D-6226 (January 2015).

The term polyurethane (PUR) is used for foams of which the formulations are mostly polyurethane based or polyisocyanurate (PIR) for foams of which the formulations are mostly polyisocyanurate based.

According to an embodiment, the invention relates to a rigid foam or composition allowing a rigid foam to be obtained made from polyurethane and/or polyisocyanurate. According to an embodiment, the invention relates to a rigid foam or composition allowing a rigid foam to be obtained made from polyurethane. According to an embodiment, the invention relates to a rigid foam or composition allowing a rigid foam to be obtained made from polyisocyanurate. According to an embodiment, the invention relates to a rigid foam or composition allowing a rigid foam to be obtained made from polyurethane and polyisocyanurate.

"Foam with closed cells" means a foam of which the cell structure includes walls between each cell constituting a set of adjoining and separate cells allowing for the imprisonment of an expansion gas. A foam is qualified as a foam with closed cells when it has a maximum of 10% open cells. Typically foams with closed cells are mostly rigid foams.

"Foam with open cells" means a foam of which the cell structure is constituted of a continuous cell matrix with open walls between the cells which does not allow for the imprisonment of an expansion gas. Such a foam makes it possible to create percolation paths within the cell matrix thereof. Typically, open cell foams are mostly flexible or semi-rigid foams.

Advantageously, the foam according to the invention has a cell size with a minimum diameter in the transverse direction comprised between 50 and 390 µm, preferably comprised between 60 and 385 µm, 70 and 380 µm, 75 and 375 µm, 80 and 350 µm, or 90 and 325 µm.

"Minimum diameter in the transverse direction" or "minimum diameter in the longitudinal direction" means the minimum Feret diameter value $D_F^{min}$ hereinbelow measured in the direction transverse or longitudinal to the expansion of the foam, or the minimum diameter of a cell in the given direction. "A maximum diameter in the transverse direction" or "a maximum diameter in the longitudinal" means the value maximum Feret diameter $D_F^{max}$ hereinbelow measured in the direction transverse or longitudinal to the expansion of the foam, or the maximum diameter of a cell in the given direction. Typically, the diameter of the cells is measured with scanning electron microscopy (SEM), with a SEM from Jeol JSM-IT100, by the observation of a cubic foam cut with a microtome blade and analysed according to two characteristic orientations: parallel and perpendicular to the direction of the rising of the foam, by using the ImageJ software (Open Source processing program). The average diameter of a minimum of 100 cellules per samples of foams is measured then the aspect ratio of the cells is defined by eq. 1

$$R = \frac{1}{n}\sum_{i=1}^{n} \frac{D_F^{max}}{D_F^{min}}$$

Where $D_{Fmax}$ and $D_{Fmin}$ are maximum and minimum Feret diameters, n is the number of cells measured for a given sample.

"Direction transversal to the expansion" means the section of the foam perpendicular to the main direction of increase in the volume of the reaction mixture and/or parallel to the deposition surface of the reaction mixture.

"Direction longitudinal to the expansion", means the section of the foam parallel to the main direction of increase in the volume of the reaction mixture and/or perpendicular to the deposition surface of the reaction mixture.

Advantageously, the foam according to the invention has a bulk density comprised between 20 to 80 kg/m³, more preferably 22 to 60 kg/m³, even more preferably, 25 to 50 kg/m³ typically, 27 to 40 kg/m³.

The bulk density of the foam is measured by a Foamat FPM 150 (Messtechnik GmbH) provided with cylindrical recipients 180 mm high and 150 mm in diameter, an ultrasound probe LR 2-40 PFT/a thermocouple of the K type, and a pressure sensor FPM 150 according to the instructions of the supplier. Preferably the bulk density is determined according to the standard EN 1602 (September 2013).

Advantageously, the foam has a cell size with a minimum diameter in the transverse direction comprised between 40 and 400 µm and a bulk density comprised between 20 to 80 kg/m³, or, a cell size with a minimum diameter in the transverse direction comprised between 40 and 400 µm and a bulk density comprised between 22 to 60 kg/m³ or, a cell size with a minimum diameter in the transverse direction comprised between 40 and 400 µm and a bulk density comprised between 25 to 50 kg/m³, or a cell size with a minimum diameter in the transverse direction comprised between 50 and 350 µm and a bulk density comprised between 20 to 80 kg/m³, or, a cell size with a minimum diameter in the transverse direction comprised between 50 and 350 µm and a bulk density comprised between 22 to 60 kg/m³ or, a cell size with a minimum diameter in the transverse direction comprised between 50 and 350 µm and a bulk density comprised between 25 to 50 kg/m³ or a cell size with a minimum diameter in the transverse direction comprised between 60 and 325 µm and a bulk density comprised between 20 to 80 kg/m³, or, a cell size with a minimum diameter in the transverse direction comprised between 60 and 325 µm and a bulk density comprised between 22 to 60 kg/m³ or, a cell size with a minimum diameter in the transverse direction comprised between 60 and 325 µm and a bulk density comprised between 25 to 50 kg/m³.

Advantageously, the foam according to the invention has a measurement of the thermal conductivity coefficient less than 30 mW/(m×K), preferably comprised between 18 and 30 mW/(m×K), more preferably comprised between 28 to 20 mW/(m×K). "Thermal conductivity" means the measurement of the magnitude characterising the transfer of energy (quantity of heat) passing through the material per surface unit under a given temperature gradient. The measurement of the thermal conductivity coefficient (or thermal conductivity coefficient lambda) corresponds to a quantification of the thermal conductivity and can be measured by a flow meter such as an HFM 436/3 marketed by the company Netzsch by following the protocol recommended by the standard EN 12667 (July 2001).

Typically, the foam according to the invention has a measurement of the thermal conductivity coefficient less than 30 mW/(m×K), and/or a cell size with a minimum diameter in the transverse direction comprised between 40 and 400 µm, preferably the foam according to the invention has a measurement of the thermal conductivity coefficient less than 30 mW/(m×K), and/or a cell size with a minimum diameter in the transverse direction comprised between 50 and 350 µm, typically, the foam according to the invention has a measurement of the thermal conductivity coefficient less than 30 mW/(m×K), and/or a cell size with a minimum diameter in the transverse direction comprised between 60 and 325 µm, or, the foam according to the invention has a measurement of the thermal conductivity coefficient comprised between 18 and 30 mW/(m×K), and/or a cell size with a minimum diameter in the transverse direction comprised between 40 and 400 µm, preferably the foam according to the invention has a measurement of the thermal conductivity coefficient comprised between 18 and 30 mW/(m×K), and/ or a cell size with a minimum diameter in the transverse direction comprised between 50 and 350 µm, typically, the foam according to the invention has a measurement of the thermal conductivity coefficient comprised between 18 and 30 mW/(m×K), and/or a cell size with a minimum diameter in the transverse direction comprised between 60 and 325 µm or, the foam according to the invention has a measurement of the thermal conductivity coefficient comprised between 20 and 28 mW/(m×K) and/or a cell size with a minimum diameter in the transverse direction comprised between 40 and 400 µm, preferably the foam according to the invention has a measurement of the thermal conductivity coefficient comprised between 20 and 28 mW/(m×K) and/or a cell size with a minimum diameter in the transverse direction comprised between 50 and 350 µm, typically, the foam according to the invention has a measurement of the thermal conductivity coefficient comprised between 20 and 28 mW/(m×K) and/or a cell size with a minimum diameter in the transverse direction comprised between 60 and 325 µm.

The term "polyol" refers to a molecule that has at least 2 hydroxyl groups. The polyol can be for example a polyester polyol or a polyether polyol or an alcohol sugar. The term "polyester polyol" refers to molecules comprising hydroxyl groups linked together by ester linkages. In an embodiment, the polyol is selected from a polyester polyol or a polyether polyol. According to an embodiment, the foam or the composition of the invention comprises at least two polyols, a polyol referred to as polyol A and a polyol referred to as polyol B. According to an embodiment, the foam or the composition of the invention comprises a mixture of two polyols, of the polyol referred to as polyol A and of the polyol referred to as polyol B. In an embodiment, the polyol A is selected from polyester polyols or polyether polyols, more preferably the polyol A is a polyester polyol A. In an embodiment, the polyol B is selected from polyester polyols B, polyether polyols B or mixtures thereof. In an embodiment, the polyol B is a polyester polyol B.

According to an embodiment, the foam or the composition of the invention comprises at least two polyols (polyesters), a polyester polyol referred to as polyester polyol A and a polyol referred to as polyol B selected from polyols polyesters and the polyether polyols B.

Typically, the polyester polyol A can be biosourced in that it is obtained from polyols naturally found in plants or obtained from derivatives coming from biomass.

Advantageously, the foam or the composition allowing such a foam to be obtained comprises 5 to 49%, 6 to 48% or 7 to 48%, preferably, 10 to 45%, 15 to 42%, 17 to 40%, 20 to 37%, 22 to 36% polyester polyol A by weight relative to the total weight of the polyol preferably of polyester polyol and/or of polyether polyol. The other polyols in particular polyester polyols and/or polyether polyols, such as the polyol B, contained in the foam can be of petrosourced origin.

"Petrosourced polyol", "petrosourced polyester polyol" or petrosourced polyether polyol mean a polyether polyol or a polyester polyol of which the method of obtaining entails at least 20% of the reagents coming from fossil resources.

In said polyester polyol A, the molecules X, Y, Z, Y' and X' are linked together by ester linkages. Typically, the diols X and X' and the alcohol sugar Z are linked to the two diacids Y and Y' by ester linkages each formed between an acid function of Y or of Y' and a primary hydroxyl function of Z, X or X'. Advantageously, the polyester polyol has a low residual acidity, typically, when it is obtained by two successive polycondensations followed by a step of neutralising (for example with potash or soda). The residual acidity must for example be less than 5 mg kOH/g. The measurement of this residual acidity is well known to those skilled in the art. It is determined for example, by methylene blue colorimetric assay by using a solution of potash at 0.1 mol/L in methanol.

The polyester polyol A according to the invention advantageously has, the general chemical formula $C_aH_bO_c$ with $22 \le a \le 42$, $38 \le b \le 78$, $14 \le c \le 22$.

Typically, the polyester polyol A according to the invention has a molecular weight comprised between 350 g/mol and 2,000 g/mol, preferably between 420 g/mol and 1800 g/mol and more preferably, between 450 and 1700 g/mol. According to the invention, the molar mass of the polyester polyol can be determined by different methods such as steric exclusion chromatography.

Advantageously, the polyester polyol A has a hydroxyl value from 300 to 900 mg KOH/g. The hydroxyl value (OHv) can be calculated with the following formula:

$$OHv = \text{functionality of the polyester polyol} \times 56109.37 / \text{Molecular weight of the polyester polyol}.$$

According to an embodiment, the polyol A, typically the polyester polyol A has a functionality greater than 2, from 2 to 5, preferably from 2.5 to 3.5 more preferably from 2.7 to 3.3.

Typically, the polyester polyol A according to the invention has a viscosity at 25° C. comprised from 4,000 to 25,000 mPa·s, preferably between 4,500 and 22,500 mPa·s, even more preferably between 5,000 and 20,000 mPa·s. In a preferred embodiment, the polyester polyol A according to the invention has a viscosity at 25° C. from 10,000 to 20,000 mPa·s. In a preferred embodiment, the polyester polyol A according to the invention has a viscosity at 25° C. from 12,000 to 18,000 mPa·s. In a preferred embodiment, the polyester polyol A according to the invention has a viscosity at 25° C. from 13,000 to 16,000 mPa·s.

"Viscosity at 25° C." means the resistance to flow and/or to shearing strength of the material for a temperature of the latter set to 25° C. It is measured using a Brookfield RVT DV-II viscometer from Braive-Instruments, by using a pin of the VR range, pin RV-5. The pin is immersed in such a way as to not touch the edges or the bottom of the beaker used for the measurement. The value is given automatically by the equipment by working with a torque comprised between 10 and 100% of the maximum torque of the device. According to an embodiment, the viscosity is determined according to standards ASTM D4878, in particular ASTM D4878-08.

Advantageously, said mousse further comprises a polyol B, preferably a polyether polyol B or a polyester polyol B having:
- a hydroxyl value (OHv expressed in mg KOH/g) comprised between 80 and 800, preferably comprised between 100 and 700, even more preferably between 120 and 600 typically, between 150 and 350 and/or
- a functionality greater than or equal to 2 and/or
- a molar mass (Mn expressed in g/mol) comprised between 50 and 4,000, preferably between 150 and 3500, even more preferably between 200 and 3,000 typically between 250 and 3,000 and/or
- an acid value (AV expressed in mg KOH/g) less than 10, preferably less than 8, even more preferably, less than 4 and/or
- a viscosity (mPa·s) less than 50,000, preferably less than 35,000, more preferably less than 20,000 typically less than 10,000 advantageously comprised between 50,000 and 100 or between 35,000 and 150 or between 20,000 and 200. In an embodiment, the polyester polyol B has a viscosity at 25° C. from 500 to 12,000 mPa·s. In a preferred embodiment, the polyester polyol B has a viscosity at 25° C. from 1,000 to 12,000 mPa·s, from 2,000 to 10,000 mPa·s, or from 3,000 to 10,000 mPa·s, or from 2,000 to 6,000 mPa·s.

Advantageously the polyol B has a molar mass (Mn) comprised between 150 and 3,500 g/mol and/or a hydroxyl value (OHv) comprised between 80 and 800 mg KOH/g and/or a viscosity less than 50,000 mPa·s, typically, a molar mass (Mn) comprised between 50 and 4,000 g/mol and/or a hydroxyl value (OHv) comprised between 100 and 700 mg KOH/g and/or a viscosity at 25° C. such as described hereinbelow.

Typically, the polyester polyol A and the polyol B have a difference in viscosity at 25° C. comprised between 500 and 40,000 mPa·s preferably, comprised between 1,500 and 30,000 mPa·s, more preferably comprised between 2,500 and 20,000.

In a preferred embodiment, the polyester polyol A and the polyol B have a difference in viscosity at 25° C. from 5,000 to 15,000 mPa·s or from 8,000 to 12,000 mPa·s. Advantageously, the polyester polyol A and the polyol B are in a polyol A/polyol B mass ratio comprised between 5/95 to 50/50. According to an embodiment, the polyester polyol A and the polyol B are in a polyol A/polyol B mass ratio from 10/90 to 45/50. According to a preferred embodiment, the polyester polyol A and the polyol B are in a polyol A/polyol B mass ratio from 25/90 to 45/50. According to an embodiment, the polyester polyol A and the polyol B are in a polyol A/polyol B mass ratio from 35/90 to 45/50.

The hydroxyl value corresponds to the number of mg of KOH required to deprotonate all the hydroxyl groups present in one gram of polyol. The hydroxyl value can be determined by inverted assay using potash, for example according to the standard ASTM 4274-99 (1999) wherein the colorimetric titration is replaced with a pH-metric titration.

"Alcohol sugar" such as used in the expression "alcohol sugar Z" means a hydrogenated form of monosaccharide of which the carbonyl group (aldehyde or ketone) has been reduced to a primary or secondary hydroxyl. Typically, the alcohol sugar is selected from glycerol, sorbitol, erythritol, xylitol, araditol, ribitol, dulcitol, mannitol and volemitol. In an embodiment, the alcohol sugar is selected from glycerol, sorbitol, erythritol, xylitol, araditol, ribitol, dulcitol and mannitol. In an embodiment, the alcohol sugar is selected from sorbitol, erythritol, xylitol, and mannitol. In an embodiment, the alcohol sugar is selected from glycerol, sorbitol, and mannitol. In a preferred embodiment, the alcohol sugar is selected from sorbitol and mannitol. In a preferred embodiment, the alcohol sugar is sorbitol.

According to an embodiment, the composition or the foam according to the invention does not comprise glycerol. According to an embodiment, the polyester polyol A according to the invention is not modified with glycerol or with ethylene glycol.

According to an embodiment, the composition or the foam according to the invention comprises less than 2% by weight of the composition of polyoxyethylene glycols (PEG). According to an embodiment, the composition or the foam according to the invention comprises less than 1% by weight of the composition of polyoxyethylene glycols (PEG). According to an embodiment, the composition or the foam according to the invention comprises less than 0.5% by weight of the composition of polyoxyethylene glycols (PEG). According to an embodiment, the composition, the foam, or the polyester polyol A according to the invention does not comprise polyoxyethylene glycols (PEG, having the formula $C_{2n}$—$H_{4n+2}O_{n+1}$, n=2-50) such as diethylene glycol or PEG 400. According to an embodiment, the polyester polyol A according to the invention is not modified with diethylene glycol.

"Diacid" means a carbon chain comprising two acid groups. According to the invention, the polyester polyol comprises two molecules Y and Y' of diacid. These molecules can be identical or different in C4 to C36, preferably C4 to C24. Typically, the two molecules of diacid are independently selected from butanedioic acid (Succinic acid), pentanedioic acid (Glutaric acid), hexanedioic acid (Adipic acid), heptanedioic acid (Pimelic acid), octanedioic acid (Suberic acid), nonanedioic acid (Azelaic acid), decanedioic acid (Sebacic acid), undecanedioic acid, dodecanedioic acid, tridecanedioic acid (Brassylic acid), tetradecanedioic acid, pentadecanedioic acid, hexadecanedioic acid, dimers of fatty acids having up to 36 carbons (C36) or mixtures thereof. Typically, Y and Y' are C5 to C16 or C6 to C12 diacids. Advantageously, the preferred molecules of diacid are independently selected from adipic acid and succinic acid. According to an embodiment, Y and Y' are identical. According to an embodiment, Y and Y' are molecules of adipic acid.

In a preferred embodiment, Y and Y' are not aromatic diacids. In a preferred embodiment, Y and Y' are not aromatic diacids selected from phthalic acid, isophthalic acid or terephthalic acid.

According to an embodiment, the polyol A, typically the polyester polyol A, does not comprise phthalic acid, isophthalic acid, terephthalic acid, and anhydrides thereof, dimethyl terephthalate (DMT) or polyethylene terephthalate (PET).

According to an embodiment, the composition according to the invention comprises less than 45% by weight of the composition of phthalic acid, isophthalic acid, terephthalic acid, and the anhydrides thereof, dimethyl terephthalate (DMT) or polyethylene terephthalate (PET). According to an embodiment, the composition according to the invention comprises less than 40% by weight of the composition of phthalic acid, isophthalic acid, terephthalic acid, and the anhydrides thereof, dimethyl terephthalate (DMT) or polyethylene terephthalate (PET). According to an embodiment, the composition according to the invention comprises less than 30% by weight of the composition of phthalic acid, isophthalic acid, terephthalic acid, and the anhydrides thereof, dimethyl terephthalate (DMT) or polyethylene terephthalate (PET). According to an embodiment, the composition according to the invention comprises less than 25% by weight of the composition of phthalic acid, isophthalic acid, terephthalic acid, and the anhydrides thereof, dimethyl terephthalate (DMT) or polyethylene terephthalate (PET). According to an embodiment, the composition according to the invention comprises less than 20% by weight of the composition of phthalic acid, isophthalic acid, terephthalic acid, and the anhydrides thereof, dimethyl terephthalate (DMT) or polyethylene terephthalate (PET). According to an embodiment, the composition according to the invention comprises less than 10% by weight of the composition of phthalic acid, isophthalic acid, terephthalic acid, and the anhydrides thereof, dimethyl terephthalate (DMT) or polyethylene terephthalate (PET).

According to an embodiment, the composition of the invention comprises less than 5% or less than 2% by weight of the composition of monofunctionalised fatty acids (mono-fatty acids). According to an embodiment, the composition of the invention does not comprise monofunctionalised fatty acids (mono-fatty acids). According to these two embodiments, the monofunctionalised fatty acids are selected from castor oil, polyhydroxy fatty acids, ricinoleic acid, hydroxyl group-modified oils, grape seed oil, black cumin oil, pumpkin kernel oil, pumpkin seed oil, soybean oil, wheat germ oil, rape oil, sunflower oil, sunflower oil, peanut oil, peanut oil, kernel oil, pistachio oil, almond oil, olive oil, macadamia nut oil, avocado oil, buckthorn oil, sesame oil, hemp oil, hazelnut oil, primrose oil, wild rose oil, safflower oil, walnut oil, hydroxylated modified fatty acids and esters of fatty acids with a base of myristoleic acid, palmitoleic acid, oleic acid, vaccenic acid, petroselic acid, gadoleic acid, erucic acid, nervonic acid, linoleic acid, α and γ-linolenic acid, stearidonic acid, arearidonic acid, clupanodonic acid and cervonic acid. According to these two embodiments, the monofunctionalised fatty acids are preferably selected from oleic acid, rape oil or soybean oil.

"Diol" means a carbon chain comprising two alcohol groups. According to the invention, the polyester polyol comprises two molecules X and X' of identical or different diols. Typically, the diol molecules are independently selected from 1,2 ethanediol, 1,3 propanediol, 1,4-butanediol, 1,6 hexanediol, 1,8 octanediol, 1,10 decanediol, 1,12 dodecanediol and mixtures thereof. According to an embodiment, the diol molecules are independently selected from 1,2 ethanediol, 1,3 propanediol, 1,4-butanediol and mixtures thereof. According to an embodiment, the diol molecules are identical and selected from 1,2 ethanediol, 1,3 propanediol and 1,4-butanediol. According to an embodiment, the diol molecules are identical and selected from 1,3 propanediol and 1,4-butanediol. According to an embodiment, the diol molecules are molecules of 1,4-butanediol.

Advantageously, the polyester polyol according to the invention is selected from bis(1,2 ethanediol)-sorbitol diadipate, bis(1,3 propanediol)-sorbitol diadipate, bis(1,4-butanediol)-sorbitol diadipate, bis(1,4-butanediol)-sorbitol diadipate modified with glycerol, bis(1,6 hexanediol)-sorbitol diadipate, bis(1,8 octanediol)-sorbitol diadipate, bis(1,10 decanediol)-sorbitol diadipate, bis(1,12 dodecanediol)-sorbitol diadipate, bis(1,4 butanediol)-sorbitol disuccinate and sorbitol-diadipate-sorbitol. Preferably, said polyolpolyester is selected from bis(1,8 octanediol)-sorbitol diadipate, bis(1,10 decanediol)-sorbitol diadipate and bis(1,4-butanediol)-sorbitol-diadipate. According to an embodiment, preferably, the polyolpolyester A is selected from bis(1,3 propanediol)-sorbitol diadipate, bis(1,4-butanediol)-sorbitol diadipate, bis(1,6 hexanediol)-sorbitol diadipate, bis(1,8 octanediol)-sorbitol diadipate, bis(1,10 decanediol)-sorbitol diadipate, bis(1,12 dodecanediol)-sorbitol diadipate, bis(1,4 butanediol)-sorbitol disuccinate, Preferably, the polyolpolyester A is selected from bis(1,8 octanediol)-sorbitol diadipate, bis(1,10 decanediol)-sorbitol diadipate and bis(1,4-butanediol)-sorbitol-diadipate. Preferably, the polyolpolyester A is bis(1,4-butanediol)-sorbitol-diadipate.

The invention also relates to a rigid foam or composition allowing a rigid foam to be obtained comprising polyols among which a polyester polyol A, said foam having a cell size with a minimum diameter in the transverse direction comprised between 40 and 400 µm, and/or a bulk density comprised between 20 to 80 kg/m³ and/or a measurement of the thermal conductivity coefficient less than 30 mW/(m×K) and/or said foam or the composition allowing such a foam to be obtained comprises 5 to 50% preferably, 5 to 49% of a polyester polyol A by weight relative to the total weight of the polyol typically in relation to the total weight of polyester polyol and/or polyether polyol, said polyester polyol A being obtained by a method comprising the following steps:

a) polycondensing at a temperature comprised between 110 and 200° C., preferably, 120 to 180° C., more preferably, 130 and 170° C., typically 150° C., advantageously for 5 to 10 hours:
  i. of a C3 to C8 alcohol sugar Z, preferably in C4 to C7, advantageously in C5-C6, typically selected from glycerol, sorbitol, erythritol, xylitol, araditol, ribitol, dulcitol, mannitol and volemitol,
  ii. of two identical or different diacids Y and Y' in C4 to C36, preferably in C5 to C24,
  iii. of two identical or different diols X and X' in C2 to C12, preferably in C3 to C8, typically in C4 advantageously, independently selected from 1,2 ethanediol, 1,3 propanediol, 1,4-butanediol, 1,6 hexanediol, 1,8 octanediol, 1,10 decanediol, 1,12 dodecanediol, 1,4 butanediol and mixtures thereof,
b) optionally, neutralising free acid functions in such a way as to decrease the residual acidity of the polyester polyol typically, to a neutral pH (pH=7), for example, by a base typically, a strong base such as potash, or by a weak base such as sodium carbonate, sodium bicarbonate, potassium carbonate or a C4 to C8 mono-, bi- or tri-alcohol, such as hexanol; preferably the neutralising is carried out by adding potassium carbonate or potash.

According to an embodiment, the polyester polyol A is obtained by a method comprising the following steps:
c) polycondensing at a temperature comprised between 110 and 200° C., preferably, 120 to 180° C., more preferably, 130 and 170° C., typically 150° C., advantageously for 5 to 10 hours:
  iv. an alcohol sugar Z in C4 to C7, advantageously in C5-C6 selected from sorbitol, erythritol, xylitol, and mannitol,
  v. two identical or different C5 to C24 diacids Y and Y', more preferably selected from adipic acid and succinic acid,
  vi. of two identical or different diols X and X' in C2 to C12, preferably in C3 to C8, typically in C4 advantageously, independently selected from 1,2 ethanediol, 1,3 propanediol, 1,4-butanediol, 1,6 hexanediol, 1,8 octanediol, 1,10 decanediol, 1,12 dodecanediol, 1,4 butanediol and mixtures thereof,
d) optionally, neutralising free acid functions in such a way as to decrease the residual acidity of the polyester polyol typically, to a neutral pH (pH=7), for example, by a base typically, a strong base such as potash, or by a weak base such as sodium carbonate, sodium bicarbonate, potassium carbonate or a C4 to C8 mono-, bi- or tri-alcohol, such as hexanol; preferably the neutralising is carried out by adding potassium carbonate or potash.

Advantageously, during the step of polycondensing, the diols X and X' and the alcohol sugar Z are at a molar ratio $(X+X')/Z$ comprised between 1 and 3, preferably between 1.5 and 2.5 more preferably comprised between 1.8 and 2.2.

Typically during the step of polycondensing, the diacids Y and Y' and the alcohol sugar are at a molar ratio $(Y+Y')/Z$ comprised between 1 and 3, preferably between 1.5 and 2.5 more preferably comprised between 1.8 and 2.2.

According to an embodiment, during the step of polycondensing, the diols X and X' and the diacids Y and Y' are at a molar ratio $(X+X')/(Y+Y')$ comprised between 0.5 and 2, preferably between 0.7 and 1.5 more preferably comprised between 0.8 and 1.2.

Advantageously, the step of polycondensing comprises a first polycondensation (a) of the alcohol sugar Z and of the diacids Y and Y' and a second polycondensing (b) of the product obtained in (a) with the diols X and X'. This polycondensing in two steps makes it possible to obtain polyester polyol with this symmetrical structure. Typically, the diacids Y and Y' are identical and/or the diols X and X' are identical.

According to an embodiment, the alcohol sugar Z is mixed with the molecule or the molecules of diacid Y and Y' the incubated for more than one hour, more preferably between 2 and 5 hours, even more preferably between 2.5 and 4 h, typically for 3 hours. The diol molecule or the diol molecules X and X' are added in a second step to the mixture then incubated for more than 4 hours, preferably, between 5 and 10 hours, typically, between 5.5 and 7 h. Preferably, the step of polycondensing is carried out in a vacuum.

Advantageously, during the step of polycondensing, the molecules of diacid Y and Y' react with the primary alcohols of the molecules of alcohol sugar Z then diols X and X'. The molecules of water coming from the reaction are recovered for the purpose of the elimination thereof.

The invention further relates to a rigid foam or a composition allowing a rigid foam to be obtained comprising a polymer comprising polyols among which 5 to 50%, typically 5 to 49% or 6 to 48% by mass of a polyester polyol A on the weight of polyols, typically, said polymer is a polyurethane and/or a polyisocyanurate.

Advantageously, the polymer according to the invention has a molar mass greater than $1.7 \cdot 10^6$ g/mol. Typically, the polymer is a cross-linked polymer.

"Polyurethane" means a polymer comprising urethane functions in other words, a urethane polymer. These polymers result substantially from the reaction of polyols in particular of the polyester polyol of the invention and of polyisocyanates. These polymers are generally obtained from formulations that have an index from 100 to 150 preferably, from 105 to 130 corresponding to an NCO/OH ratio comprised between 1 and 1.5, preferably between 1.05 and 1.3.

"Polyisocyanurate" means the polymers resulting from the reaction of polyols in particular of the polyester polyol of the invention and of polyisocyanates, which contain, in addition to urethane linkages, other types of functional groups, in particular triisocyanuric rings formed by trimerisation of polyisocyanates. These polymers, normally also called modified polyurethanes or polyisocyanurate-polyurethane, are generally obtained from formulations that have an index 150 to 700, preferably between 200 and 500, even more preferably between 250-400, which is an NCO/OH ratio comprised between 1.5 and 7, preferably between 2.0 and 5.0 preferably between 2.5 and 4.0.

According to the invention, said polymer is a mixture of polyurethane and polyisocyanurate. Such a mixture is observed for example when said polymer comprises urethane functions and polyisocyanates trimerised into triisocyanuric rings. Typically, said polymer is a mixture of polyurethane and polyisocyanurate and has an index greater than 150 or less than or equal to 500, corresponding to an NCO/OH ratio greater than 1 or less than or equal to 5.

"NCO/OH ratio" means, in terms of the present invention, the ratio between the number of NCO functions of the polyisocyanate and the number of OH functions of polyols, of any other component including OH groups (water, solvents) present in a formulation. The NCO/OH ratio is calculated with the following formula:

$$\text{Ratio} \frac{NCO}{OH} = \frac{\sum MexpPi_i \times MEPi_i}{\sum MexpOH_i \times MEOH_i}$$

Ratio NCO/OH=$M_{exp}Pi \times MEPi/M_{exp}SA1 \times MESA1$ where:
$M_{exp}Pi$ is the mass of the polyisocyanate;
$M_{exp}OH_i$ is the mass of each component of the mixture including hydroxyl groups;
MEPi is the equivalent mass of the polyisocyanate and corresponds to the ratio between the molar mass of the polyisocyanate and the functionality of the polyisocyanate;
$MEOH_i$ is the equivalent mass of each component of the mixture carrying hydroxyl groups and corresponds to the ratio between the molar mass of the component and the functionality of the component.

"Urea linkage" means in terms of the present invention a disubstituted urea linkage which is the product of the reaction between a primary amine and a isocyanate function of a polyisocyanate. The primary amines can be introduced into the composition or are the product of the reaction between a molecule of water and an isocyanate function of a polyisocyanate.

Typically, said rigid foam or composition allowing said rigid foam to be obtained comprising said polyester polyol A according to the invention or said polymer according to the invention in particular the prepolymer, further comprises, a reaction catalyst, a polyisocyanate having a functionality at least equal to 2, a stabiliser, a blowing agent, and additives.

"Polyisocyanate" means any chemical compound comprising at least two separate isocyanates chemical functions (NCO), in other words, having "a functionality at least equal to 2". When the polyisocyanate has a functionality of 2, this is referred to as diisocyanate. "Functionality" means, in terms of the present invention, the total number of reactive isocyanate functions per molecule of isocyanate. The functionality of a product is evaluated by the titration of the function NCO by a method of assay in return from the excess dibutylamine by hydrochloric acid. Typically, said polyisocyanate has a functionality between 2 and 5, preferably between 2.5 and 3.5 even more preferably between 2.7 and 3.3. Advantageously, said polyisocyanate is selected from aromatic, aliphatic, cycloaliphatic polyisocyanates and mixtures thereof. Mention can be made for example of 2,4-toluene diisocyanate, 2,6-toluene diisocyanate, mixtures of 2,4- and 2,6-toluene diisocyanate, m-phenylene diisocyanate, p-phenylene diisocyanate, cis/trans of cyclohexane diisocyanate hexamethylene diisocyanate, m- and p-tetramethylxylylene-diisocyanate, m-xylylene, p-xylylene diisocyanate, naphthalene-m, m-diisocyanate, 1,3,5-hexamethyl mesitylene triisocyanate, 1-methoxyphenyl-2,4-diisocyanate, 4,4'-diphenyl-methane diisocyanate, 4,4'-diisocyanabiphenylene 3,3'-dimethoxy-4,4'-diphenyl diisocyanate, 3,3'-dimethyl-4,4'-diphenyl diisocyanate, 4,4",4"-triphenylmethane triisocyanate, toluene-2,4,6m-triisooyanate, 4,4'-dimethyl diphenyl methane-2,2',5,5'-tetraisocyanate, and aliphatic isocyanates, such as 4,4'-hydrogenated diphenylmethane diisocyanate, hydrogenated toluene diisocyanate (TDI) and hydrogenatem meta- and paraxylene diisocyanate of tetramethylxylylene diisooyanate (TMXDI® isooyanate, product of American Cyanamid Co., Wayne, N.J., USA.), 3:1 meta-tetramethylxylylene diisocyanate/trimethylolpropane (Cythane 3160® isocyanate, from the company American Cyanamid Co.), the plurifunctional molecules such as poly-diisocyanate of diphenylmethylene (pMDI) and analogues thereof. Typically the polyisocyanate is selected from toluene diisocyanate (TDI), 4,4'-diphenylmethane diisocyanate (or 4,4'-diisocyanate of diphenylmethylene or 4,4'-MDI), polymethylene polyphenylene polyisocyanate (polymeric MDI, pMDI) and mixtures thereof. In a particular embodiment the polyisocyanate is poly-diisocyanate of diphenylmethylene (pMDI).

"Reaction catalyst" means a compound which when introduced in a low quantity accelerates the kinetics of the formation of the urethane linkage (—NH—CO—O—) by reaction between the polyester polyol coming from the invention, the other polyols of the mixture and a polyisocyanate or activates the reaction between a polyisocyanate and water or activates the trimerisation of the isocyanates. Typically the reaction catalysts are selected from tertiary amines (such as N,N-Dimethylcyclohexylamine), tin derivatives (such as tin dibutyldilaurate), ammonium salts (such as methanaminium N,N,N-trimethyl of 2,2-dimethylpropanoate) of metal alkali carboxylates (such as 2-potassium ethylhexanoate or potassium octoate) amine ethers (such as bis(2-dimethylaminoethyl) ether), and triazines (such as 1,3,5-Tris(3-(dimethylamino)propyl))hexahydro-1,3,5-triazine). As illustrated in the examples of the application, the catalyst can be a mixture of at least one tertiary amine, at least one potassium carboxylate and at least one triazine. In an embodiment, the catalyst is a mixture of a tertiary amine, a potassium carboxylate and a triazine. In an advantageous embodiment, the catalyst is a mixture of a tertiary amine, a potassium carboxylate and a triazine; the mass ratio of the amine catalysts over the potassium carboxylate being from 0.2 to 2, more preferably from 0.5 to 1.5. In an advantageous embodiment, the catalyst is a mixture of a tertiary amine, a potassium carboxylate and a triazine; the mass ratio of the triazine and of the tertiary amine over the potassium carboxylate being from 0.2 to 2, more preferably from 0.5 to 1.5.

In a particular embodiment, the catalyst is selected from N, N-dimethylcyclohexylamine, bis(2-dimethylaminoethyl) ether, 1,3,5-tris(3-[dimethylamino] propyl)-hexahydro-s-triazine, potassium 2-ethylhexanoate and mixtures thereof.

In a particular embodiment, the catalyst is a mixture of bis (2-dimethylaminoethyl) ether, 1,3,5-tris(3-[dimethylamino] propyl)-hexahydro-s-triazine, and 2-potassium ethylhexanoate; the mass ratio of the triazine and of the tertiary amine over the potassium carboxylate being from 0.5 to 1.5, more preferably from 0.5 to 1.

Advantageously, the invention relates to a composition intended for the obtaining of a foam having a cell size with a minimum diameter in the transverse direction comprised between 40 and 400 μm, and/or a bulk density comprised between 20 to 80 kg/m³ and/or a measurement of the thermal conductivity coefficient less than 30 mW/(m×K), comprising said polyester polyol A being obtained by a first polycondensation (a) of a C3 to C8 alcohol sugar Z and of two identical or different C4 to C36 diacids Y and Y' and by a second polycondensation (b) of the product obtained in (a) with two identical or different C2 to C12 diols X and X', or said polyester polyol A being of general formula Rx-Ry-Z-Ry'-Rx' wherein, Z is a C3 to C8 alcohol sugar, Ry and Ry' are diesters of formula —OOC—$C_n$—COO— with n comprised between 2 and 34, and Rx and Rx' are identical or different C2 to C12 monoalcohols, at least one reaction catalyst, at least one polyisocyanate having a functionality at least equal to 2, at least one blowing agent, a stabiliser and optionally a flame retardant. Preferably, said composition comprises from 5 to 50% typically from 5 to 49% or 6 to 48% of a polyester polyol A by weight relative to the total weight of the polyol preferably of polyester polyol and/or of polyether polyol. According to an embodiment, the composition or the foam according to the invention comprises from 10 to 50% typically from 10 to 48% or from 10 to 45% of a polyester polyol A by weight relative to the total weight of the polyol preferably of polyester polyol and/or of polyether polyol.

Advantageously, when the composition is a foam or a composition allowing a foam to be obtained, the preferred polyester polyol A is a polyester polyol with a neutral pH and/or comprising a sorbitol as an alcohol sugar Z. Typically, the preferred polyester polyol A is bis(1,2 ethanediol)-sorbitol-diadipate, bis(1,6 hexanediol)-sorbitol-diadipate or bis(1,4 butanediol)-sorbitol-diadipate, more preferably, bis (1,4 butanediol)-sorbitol-diadipate, or bis(1,6 hexanediol)-sorbitol-diadipate.

According to the invention, a foam comprises after polymerisation typically, a polymer comprising a polyester polyol A according to the invention in particular a cross-linked polymer comprising a polyester polyol A, at least one reaction catalyst, at least one blowing agent, a stabiliser.

"Blowing agent" means a compound that induces via a chemical and/or physical action an expansion of a composition during a step of foaming Typically, the chemical blowing agent is chosen from water, formic acid, phthalic anhydride and acetic acid. The physical blowing agent is selected from pentane and isomers of pentane, hydrocarbons, hydrofluorocarbons, hydrochlorofluoroolefins, hydrofluoro-olefins (HFOs), ethers and mixtures thereof. Mention can be made of methylal as an example of a blowing agent of the ether type. According to the invention, a preferred mixture of chemical and physical blowing agent is for example a water/isomer of pentane or formic acid/isomer of pentane or water/hydrofluoro-olefins or isomer of pentane/methylal/water or water/methylal mixture.

"Stabiliser" means an agent allowing for the formation of an emulsion between the polyol and the blowing agent, the nucleation of the expansion sites of the blowing agent, as well as the physical stability of the polymer matrix during the progression of the reactions. In an embodiment, the stabiliser is a surfactant such as polyethersiloxane. Typically, the stabilisers are selected from any one of the silicone glycol copolymers (for example Dabco DC198 or DC193 marketed by Air Products), non-hydrolysable silicone glycol copolymer (for example DC5000 from Air Products), polyalkylene siloxane copolymer (for example Niax L-6164 from Momentive), methylsiloxane polyoxyalkylene copolymer (for example Niax L-5348 from Momentive), polyetherpolysiloxane copolymer (for example Tegostab B8870 or Tegostab B1048 from Evonik), polydimethylsiloxane polyether copolymer (for example Tegostab B8526 from Evonik), polyethersiloxane (for example Tegostab B8951 from Evonik), a modified polyether-polysiloxane copolymer (for example Tegostab B8871 from Evonik), a block polysiloxane polyoxyalkylene copolymer (for example Tegostab BF 2370 from Evonik) and derivatives thereof or mixtures thereof. In an embodiment, the stabiliser is selected from silicone glycol copolymers, a non-hydrolysable silicone glycol copolymer, a polyalkylene siloxane copolymer, a methylsiloxane polyoxyalkylene copolymer, a polyetherpolysiloxane copolymer, a polydimethylsiloxane polyether copolymer, a polyethersiloxane, a polyether-polysiloxane copolymer, a block polysiloxane polyoxyalkylene copolymer or mixtures thereof.

"Additives" means agents such as anti-oxidants (neutralisation agents of chain ends at the origin of the depolymerisation or co-monomer chains able to stop the propagation of depolymerisation), release agents (talc, paraffin solution, silicone), anti-hydrolyses, biocides, anti-UV agents (titanium oxide, triazines, benzotriazoles) and/or flame retardants (antimony, phosphorus, boron, nitrogen compounds).

"Flame retardant" means a compound having the property of reducing or preventing the combustion or the heating of the materials that it impregnates or covers, this is referred to as flame or fire retardant. Mention can be made for example alone or in a mixture, graphite, silicates, boron, halogenated or phosphorus derivatives such as Tris (1-chloro-2-propyl) phosphate (TCPP), triethylene phosphate (TEP), triaryl phosphate esters, ammonium polyphosphate, red phosphorus, trishalogenaryl, and mixtures thereof. In an embodiment, the flame retardant is phosphate of tris(1-chloro-2-propyl).

The composition according to the invention allows a polyurethane foam, a polyisocyanurate foam or mixtures thereof to be obtained.

A first embodiment of the composition according to the invention makes it possible to obtain a rigid polyurethane foam with closed cells is typically formulated with an index comprised between 101 and 200, preferably between 102 and 170, even more preferably between 105 and 150 for example 115 which is an NCO/OH ratio comprised between 1.01 and 2, preferably between 1.02 and 1.7, even more preferably between 1.05 and 1.5 for example 1.2.

Typically, such a composition comprises:
  at least 1 to 100 parts, preferably, from 40 to 100 parts even more preferably between 80 to 100 parts of polyols of which 5 to 50%, preferably 5 to 49% or 6 to 48% of a polyester polyol A by weight relative to the total weight of the polyol,
  150 to 500 parts, preferably, from 160 to 425 parts even more preferably between 180 and 375 parts of at least one polyisocyanate,
  0.5 to 5 parts of at least one catalyst typically of an amine catalyst such as dimethylcyclohexyleamine,
  0.5 to 15 parts of at least one blowing agent typically, 0.5 to 12 parts, preferably, 0.6 to 10 parts, even more preferably, 0.7 to 9 parts of a chemical blowing agent such as water and/or 0 to 60 parts, preferably, 0.5 to 30 parts, even more preferably, 1 to 25 parts of a physical blowing agent such as isopentane derivatives,
  0.2 to 5 parts of a stabiliser such as a polyether-polysiloxane copolymer and
  0 to 30 parts of a flame retardant.

In other words, according to the first embodiment, the composition comprises:
  from 0.2 to 39.8% (w/w), preferably from 7.8 to 38.3% (w/w) more preferably from 15.9 to 35.5% (w/w) of polyols, by weight in relation to the total weight of the composition, of which 5 to 50%, preferably 5 to 49% or 6 to 48% of a polyester polyol A by weight in relation to the total weight of the polyols, According to a first alternative wherein the blowing agent is a chemical blowing agent, the composition comprises:
  from 0.2 to 39.8% (w/w), preferably from 7.8 to 38.3% (w/w) more preferably from 15.9 to 35.5% (w/w) of polyols, by weight in relation to the total weight of the composition, of which 5 to 50%, preferably 5 to 49% or 6 to 48% of a polyester polyol A by weight in relation to the total weight of the polyols,
  from 47.9 to 99.6% (w/w), preferably from 51.6 to 91.1% (w/w) more preferably from 54.7 to 82.2% (w/w) of at least one polyisocyanate, and
  from 0.1 to 3.2% (w/w), preferably from 0.1 to 2.4% (w/w) more preferably from 0.1 to 1.9% (w/w) of at least one catalyst typically of an amine catalyst such as dimethylcyclohexyleamine,
  % (w/w) designating the relative concentration by weight in relation to the total weight of the composition.

According to the first alternative, the composition can include:
  from 0.2 to 39.8% (w/w), preferably from 7.8 to 38.3% (w/w) more preferably from 15.9 to 35.5% (w/w) of polyols, by weight in relation to the total weight of the composition, of which 5 to 50%, preferably 5 to 49% or 6 to 48% of a polyester polyol A by weight in relation to the total weight of the polyols,
  from 47.9 to 99.6% (w/w), preferably from 51.6 to 91.1% (w/w) more preferably from 54.7 to 82.2% (w/w) of at least one polyisocyanate,
  from 0.1 to 3.2% (w/w), preferably from 0.1 to 2.4% (w/w) more preferably from 0.1 to 1.9% (w/w) of at least one catalyst typically of an amine catalyst such as dimethylcyclohexyleamine,
  from 0.1 to 7.3% (w/w), preferably from 0.1 to 4.7% (w/w) more preferably from 0.1 to 3.3% (w/w) of a chemical blowing agent,
  from 0 to 3.2% (w/w), preferably from 0 to 2.4% (w/w) more preferably from 0 to 1.9% (w/w) of a stabiliser, and
  from 0 to 16; 5% (w/w), preferably from 0 to 13% (w/w) more preferably from 0 to 10.3% (w/w) of a flame retardant,
  % (w/w) designating the relative concentration by weight in relation to the total weight of the composition.

A rigid polyurethane foam with closed cells according to the first alternative comprises for example 100 parts of polyol, 270 parts of a polyisocyanate, 2 parts of an amine catalyst such as dimethylcyclohexyleamine, 6 parts of a blowing agent such as water, 2.5 parts of a stabiliser such as a polyether-polysiloxane copolymer and 10 parts of a flame retardant.

In other words, the composition can include, about 25.6% (w/w) of polyols such as described hereinabove, about 69.1% (w/w) of a polyisocyanate, about 0.5% (w/w) of an amine catalyst such as dimethylcyclohexyleamine, about 1.5% (w/w) of a chemical blowing agent such as water, about 0.6% (w/w) of a stabiliser such as a polyether-polysiloxane copolymer and about 2.6% (w/w) of a flame retardant; % (w/w) designating the relative concentration by weight in relation to the total weight of the composition.

In the context of the present invention "about" placed before a number, means plus or minus 10% of the nominal value of this number.

According to a second alternative of the first embodiment wherein the blowing agent is a physical blowing agent, the composition comprises:
  from 0.2 to 39.9% (w/w), preferably from 7.5 to 38.3% (w/w) more preferably from 15.4 to 35.5% (w/w) of polyols, by weight in relation to the total weight of the composition, of which 5 to 50%, preferably 5 to 49% or 6 to 48% of a polyester polyol A by weight in relation to the total weight of the polyols,
  from 42.9 to 99.7% (w/w), preferably from 48.5 to 91.2% (w/w) more preferably from 52.2 to 82.1% (w/w) of at least one polyisocyanate, from 0.1 to 3.2% (w/w), preferably from 0.1 to 2.4% (w/w) more preferably from 0.1 to 1.9% (w/w) of at least one catalyst typically of an amine catalyst such as dimethylcyclohexyleamine, from 0 to 28.3% (w/w), preferably from 0.1 to 13% (w/w) more preferably from 0.2 to 8.8% (w/w) of a chemical blowing agent, from 0 to 3.2% (w/w), preferably from 0 to 2.4% (w/w) more preferably from 0 to 1.9% (w/w) of a stabiliser, and from 0 to 16.5% (w/w), preferably from 0 to 13% (w/w) more preferably from 0 to 10.3% (w/w) of a flame retardant, % (w/w) designating the relative concentration by weight in relation to the total weight of the composition.

A second embodiment of a composition makes it possible to obtain a polyisocyanurate rigid foam with closed cells is typically formulated with an minimum index of 200 which is a NCO/OH ratio greater than 2.0, preferably an index comprised between 250 and 450, more preferably comprised between 300 and 400 which is a NCO/OH ratio preferably comprised between 2.5 and 4.5, more preferably comprised between 3.0 and 4.0.

A composition making it possible to obtain a polyisocyanurate rigid foam with closed cells comprises, 60 to 100 parts, preferably, from 70 to 100 parts even more preferably between 80 and 100 parts of polyols of which 5 to 50% typically 5 to 49% or 6 to 48% by weight of polyester polyol A on the weight of polyol, 100 to 700 parts, preferably, from 120 to 650 parts even more preferably between 150 and 575 parts of at least one polyisocyanate, 0.1 to 13 parts, preferably, from 0.5 to 12 parts even more preferably between 1 and 11 parts of at least one catalyst, preferably two catalysts, typically an amine catalyst and a potassium carboxylate (for example in an amine catalyst/potassium carboxylate ratio from 0.2 to 2), 0.5 to 80 parts, preferably, from 5 to 70 parts even more preferably between 10 and 60 parts of at least one blowing agent such as an isomer of pentane, 0.2 to 8 parts, preferably, from 1 to 7 parts even more preferably between 1.5 and 6 parts of a stabiliser 0 to 30 parts, preferably, from 5 to 25 parts even more preferably between 10 and 20 parts of a flame retardant.

In other words, according to the second embodiment, the composition comprises:

from 6.7 to 49.8% (w/w), preferably from 8.4 to 43.2% (w/w) more preferably from 10.6 to 36.7% (w/w) of polyols, by weight in relation to the total weight of the composition, of which 5 to 50%, preferably 5 to 49% or 6 to 48% of a polyester polyol A by weight in relation to the total weight of the polyols.

According to an alternative of the second embodiment, the composition comprises:

from 6.7 to 49.8% (w/w), preferably from 8.4 to 43.2% (w/w) more preferably from 10.6 to 36.7% (w/w) of polyols, by weight in relation to the total weight of the composition, of which 5 to 50%, preferably 5 to 49% or 6 to 48% of a polyester polyol A by weight in relation to the total weight of the polyols, from 30.2 to 92.0% (w/w), preferably from 35.9 to 88.9% (w/w) more preferably from 43.2 to 84.9% (w/w) of at least one polyisocyanate, and from 0.01 to 7.5% (w/w), preferably from 0.1 to 5.6% (w/w) more preferably from 0.1 to 4.2% (w/w) of at least one catalyst such as described hereinabove, % (w/w) designating the relative concentration by weight in relation to the total weight of the composition.

According to an alternative of the second embodiment, the composition comprises:

from 6.7 to 49.8% (w/w), preferably from 8.4 to 43.2% (w/w) more preferably from 10.6 to 36.7% (w/w) of polyols, by weight in relation to the total weight of the composition, of which 5 to 50%, preferably 5 to 49% or 6 to 48% of a polyester polyol A by weight in relation to the total weight of the polyols, from 30.2 to 92.0% (w/w), preferably from 35.9 to 88.9% (w/w) more preferably from 43.2 to 84.9% (w/w) of at least one polyisocyanate, from 0.01 to 7.5% (w/w), preferably from 0.1 to 5.6% (w/w) more preferably from 0.1 to 4.2% (w/w) of at least one catalyst such as described hereinabove, from 0.1 to 33.3% (w/w), preferably from 0.6 to 26.3% (w/w) more preferably from 1.4 to 19.8% (w/w) of a blowing agent such as described hereinabove, from 0 to 4.7% (w/w), preferably from 0.1 to 3.4% (w/w) more preferably from 0.2 to 2.3% (w/w) of a stabiliser such as described hereinabove, and from 0 to 15.7% (w/w), preferably from 0.1 to 3.4% (w/w) more preferably from 1.3 to 7.6% (w/w) of a flame retardant such as described hereinabove, % (w/w) designating the relative concentration by weight in relation to the total weight of the composition.

Typically, a composition making it possible to obtain a polyisocyanurate rigid foam with closed cells comprises for example, 85 parts of polyols of which 5 to 50%, typically 5 to 49% or 6 to 48% by weight of polyester polyol A on the weight of polyols; 550 parts of a polyisocyanate such as poly-diisocyanate of diphenylmethylene; 1.6 parts of an amine catalyst such as bis(2-dimethylaminoethyl)ether; 7 parts of a potassium carboxylate such as for example 2-potassium ethylhexanoate; 0.8 parts of a triazine such as 1,3,5-tri(3-[dimethylamino]propyl)-hexahydro-s-triazine; 45 parts of a blowing agent such as an isomer of pentane; 2.5 parts of a stabiliser and 15 parts of a flame retardant.

In other words, the composition can include, about 12% (w/w) of polyols such as described hereinabove, about 77.8% (w/w) of a polyisocyanate such as poly-diisocyanate of diphenylmethylene, about 0.2% (w/w) of an amine catalyst such as N,N-dimethylcyclohexyleamine, about 1% (w/w) of a potassium carboxylate such as for example 2-potassium ethylhexanoate, about 0.1% (w/w) of a triazine such as 1,3,5-tri(3-[dimethylamino]propyl)-hexahydro-s-triazine, about 0.1% (w/w) of a blowing agent such as an isomer of pentane, about 0.4% (w/w) of a stabiliser and about 2.1% (w/w) of a flame retardant;

% (w/w) designating the relative concentration by weight in relation to the total weight of the composition.

According to a particular embodiment, the composition comprises:

polyols consisting of 5 to 50% of a polyester polyol A such as described hereinabove, more preferably bis(1,4-butanediol)-sorbitol-diadipate and from 50 to 95% of a polyester polyol B such as described hereinabove, in relation to the total weight of the polyols;

at least one polyisocyanate, such as described hereinabove, typically 4,4'-polymeric methylenebis (phenylisocyanate); the isocyanate/hydroxyl molar ratio in the composition (NCO/OH) being from 3.0 to 4.0, typically 3.2; and from 0.1 to 0.5% (w/w), typically about 0.23% (w/w) of at least one catalyst; % (w/w) designating the relative concentration by weight in relation to the total weight of the composition.

According to a particular embodiment, the composition comprises:
polyols consisting of 5 to 50% of a polyester polyol A such as described hereinabove, more preferably bis(1,4-butanediol)-sorbitol-diadipate and from 50 to 95% of a polyester polyol B such as described hereinabove, in relation to the total weight of the polyols;
at least one polyisocyanate, such as described hereinabove, typically 4,4'-polymeric methylenebis (phenylisocyanate); the isocyanate/hydroxyl molar ratio in the composition (NCO/OH) being from 3.0 to 4.0, typically 3.2; and
from 0.1 to 0.2% (w/w), typically about 0.12% (w/w) of a potassium carboxylate catalyst, typically 2-potassium ethylhexanoate;
from 0.05 to 0.12% (w/w), typically about 0.08% (w/w) of a triazine catalyst, typically 1,3,5-tri(3-[dimethylamino] propyl)-hexahydro-s-triazine;
from 0.01 to 0.05% (w/w), typically about 0.03% (w/w) of a tertiary amine catalyst, typically N,N-dimethylcyclohexyleamine; % (w/w) designating the relative concentration by weight in relation to the total weight of the composition.

According to a particular embodiment, the composition comprises:
polyols consisting of 5 to 45% of a polyester polyol A such as described hereinabove, typically bis(1,4-butanediol)-sorbitol-diadipate and from 55 to 95% of a polyester polyol B such as described hereinabove, in relation to the total weight of the polyols;
at least one polyisocyanate, such as described hereinabove, typically 4,4'-polymeric methylenebis (phenylisocyanate); the isocyanate/hydroxyl molar ratio in the composition (NCO/OH) being from 3.0 to 4.0, typically 3.2; and
from 0.1 to 0.5% (w/w), typically about 0.23% (w/w) of at least one catalyst; % (w/w) designating the relative concentration by weight in relation to the total weight of the composition.

According to a particular embodiment, the composition comprises:
polyols consisting of 10 to 45% of a polyester polyol A such as described hereinabove, typically bis(1,4-butanediol)-sorbitol-diadipate and from 55 to 90% of a polyester polyol B such as described hereinabove, in relation to the total weight of the polyols;
at least one polyisocyanate, such as described hereinabove, typically 4,4'-polymeric methylenebis (phenylisocyanate); the isocyanate/hydroxyl molar ratio in the composition (NCO/OH) being from 3.0 to 4.0, typically 3.2; and
from 0.1 to 0.5% (w/w), typically about 0.23% (w/w) of at least one catalyst; % (w/w) designating the relative concentration by weight in relation to the total weight of the composition.

According to a particular embodiment, the composition comprises:
polyols consisting of 10 to 45%, or 15 to 45% of a polyester polyol A such as described hereinabove, typically bis(1,4-butanediol)-sorbitol-diadipate and from 55 to 90% or 55 to 85% respectively of a polyester polyol B such as described hereinabove, in relation to the total weight of the polyols;
at least one polyisocyanate, such as described hereinabove, typically 4,4'-polymeric methylenebis (phenylisocyanate); the isocyanate/hydroxyl molar ratio in the composition (NCO/OH) being from 3.0 to 4.0, typically 3.2; and
from 0.1 to 0.5% (w/w), typically about 0.23% (w/w) of at least one catalyst; % (w/w) designating the relative concentration by weight in relation to the total weight of the composition.

According to a particular embodiment, the composition comprises:
polyols consisting of 10 to 45%, or 15 to 45% of a polyester polyol A such as described hereinabove, typically bis(1,4-butanediol)-sorbitol-diadipate and from 55 to 90% or 55 to 85% respectively of a polyester polyol B such as described hereinabove, in relation to the total weight of the polyols;
at least one polyisocyanate, such as described hereinabove, typically 4,4'-polymeric methylenebis (phenylisocyanate); the isocyanate/hydroxyl molar ratio in the composition (NCO/OH) being from 3.0 to 4.0, typically 3.2; and
from 0.1 to 0.2% (w/w), typically about 0.12% (w/w) of a potassium carboxylate catalyst, typically 2-potassium ethylhexanoate;
from 0.05 to 0.12% (w/w), typically about 0.08% (w/w) of a triazine catalyst, typically 1,3,5-tri(3-[dimethylamino] propyl)-hexahydro-s-triazine;
from 0.01 to 0.05% (w/w), typically about 0.03% (w/w) of a tertiary amine catalyst, typically N,N-dimethylcyclohexyleamine; % (w/w) designating the relative concentration by weight in relation to the total weight of the composition.

The invention also relates to a panel or a block of rigid foam comprising the rigid foam of the invention, typically for the thermal or acoustic insulation in particular of buildings or the cryogenic insulation of refrigerators, oil tanker tank, or for the filling or assistance in floating such as in tools for assisting with floating (belt or jacket . . . ) or nautical sports. The panels can integrate on the over and under-face permeable or sealed claddings to the expansion gases with the purpose of reducing the diffusion of the latter and, consequently, have improved thermal conductivity properties after ageing, or the panels can be manufactured with or without claddings or finish coats.

"Panel" means a structure having approximately a rectangular parallelepiped shape having relatively smooth surfaces and the following dimensions from 0.3 to 50 m$^2$ of surface for a thickness from 10 to 1,000 mm, preferably, from 0.5 to 20 m$^2$ of surface for a thickness from 15 to 500 mm; more preferably, from 0.8 to 15 m$^2$ of surface for a thickness 17 to 400 mm typically, from 1 to 7 m$^2$ of surface for a thickness 20 to 250 mm Examples of dimensions are typically, a surface of 600×600 mm, 1,200×600 mm or 1,000×1,200 mm for a thickness 20 to 250 mm.

"Block" means a structure of any geometric shape, cubic parallelepiped, star or cylindrical, with or without a recess or recesses, of a volume comprised between, 1 cm$^3$ to 100 m$^3$, preferably, 10 cm$^3$ to 70 m$^3$, more preferably 100 cm$^3$ to 50 m$^3$ typically 0.5 to 35 m$^3$, typically, from 1 to 30 m$^3$.

The invention also relates to a method for obtaining a panel or a block of rigid foam according to the invention.

The invention further relates to a method for improving the insulating power and/or for improving the resistance to compression, and/or increasing Young's moduli, and/or decreasing the cell size and in particular of the minimum diameter of the cell size and/or decreasing the thermal conductivity of a rigid foam comprising polyols among which a polyester polyol A by using from 5 to 50% of said polyester polyol A by weight relative to the total weight of the polyols, preferably in relation to the total weight of polyester polyol and/or polyether polyol, said polyester polyol A being obtained by a first polycondensation (a) of a C3 to C8 alcohol sugar Z and of two identical or different C4 to C36 diacids Y and Y' and by a second polycondensation (b) of the product obtained in (a) with two identical or different C2 to C12 diols X and X' or said polyester polyol A being of general formula Rx-Ry-Z-Ry'-Rx' wherein, Z is a C3 to C8 alcohol sugar, Ry and Ry' are diesters of formula —OOC—$C_n$—COO— with n comprised between 2 and 34, and Rx and Rx' are identical or different C2 to C12 mono-alcohols.

"Young's modulus" means the value of the constant defined by the ratio of the stress on the deformation applied to a material in the elastic limit deformation of the latter.

The invention also relates to a method for reducing the thread time and/or reducing the tack-free drying time and/or reducing the difference in time between the thread time and the tack-free drying time and/or method for improving aesthetic characteristics in particular a reduction in the surface irregularities of a rigid foam by using in said rigid foam or in a composition making it possible to obtain such a rigid foam from 5 to 50% by mass of a polyester polyol A over the total mass of polyol of said foam or of said composition.

It has been demonstrated that the foam comprising the polyester polyol A according to the invention has a reduction in the difference between the thread time and the tack-free drying time by 40%, a decrease in the cell size of said foam by 44% a standardised resistance to compression at 10% improved by 7%, an increase in Young's modulus in the direction longitudinal to the rising of the foam of 96%, an increase in Young's modulus in the direction traverse to the rising of the foam of 142%, but also a decrease in the thermal conductivity of 9% in relation to a conventional foam.

"Cream time" means the time during which the reaction medium changes colour and begins to expand, this time corresponds to the moment when the reaction between the polyisocyanates and the water and/or the polyols starts, once all the constituents of the foam have been mixed.

"Thread time" means the time for forming polymer threads during the removal of a test stick introduced into the reaction medium; corresponding to the beginning of the cross-linking of the network of polyurethane and/or of polyisocyanurate.

"Tack-free drying" time means the duration at the end of which the surface of the foam no longer adheres to the surface of a test stick; corresponding to the macroscopic end of the cross-linking of the polymeric network of polyurethane and/or of polyisocyanurate.

The cream time, thread time and tack-free drying time are well known to those skilled in the art and are for example described in *Polyurethane and related foams: chemistry and technology*, K Ashida, CRC press, 2006

The invention relates to a method of thermal, acoustic or cryogenic insulation in particular of buildings, fluid transport ducts or a method for filling (cracks or free spaces), water-proofing (of structures, of cracks . . . ), of sealing or of improving the floating (typically of tools for assisting with floating or nautical sports) of an object or of a vessel by the depositing or the introduction of rigid foam blocks or panels according to the invention or by the projection in situ of a rigid foam or of a composition allowing a rigid foam to be obtained according to the invention.

The invention also relates to a method for obtaining a rigid foam typically of polyurethane or of polyisocyanurate comprising:

a step of obtaining a polyester polyol A according to the invention or a polymer according to the invention comprising 5-49% by mass of a polyester polyol A on the weight of polyols in particular of a prepolymer according to the invention 5-9% by mass of a polyester polyol A on the weight of polyols, a step of adding at least one polyisocyanate, at least one blowing agent, a stabiliser and at least one reaction catalyst, and a step of polymerising.

Although having distinct meanings, the terms "comprising", "containing", "including" and "consisting of" have been used interchangeably in the description of the invention, and can be replaced by one another. The invention shall be better understood when reading the following figures and examples given solely by way of example.

EXAMPLES

I. Equipment and Method a. Chemicals

The polyisocyanate used is 4,4'-polymeric methylenebis (phenylisocyanate) (called pMDI, commercial range Ongronat 2500 from BorsodChem). Various catalysts such as N,N-dimethylcyclohexylamine (called DMCHA) from BorsodChem, 1,3,5-tris(3-[dimethylamino] propyl)-hexahydro-s-triazine (called triazine, trade name Tegoamin C41 from Evonik), bis (2-dimethylaminoethyl) ether (called BDMAEE, trade name Lupragen N205 from BASF), 15% by weight. A solution of 2-potassium ethylhexanoate was used (called KE, trade name K-ZERO 3000 from Momentive). The flame retardant is the phosphate of tris (1-chloro-2-propyl) (TCPP) from Shekoy. The surfactant used has a polyether polysiloxane base (called PDMS, trade name TEGOSTAB® B84501 from the company Evonik). The ethylene glycol (EG) was obtained from Alfa Aesar (purity 99%). The isopentane from Inventec was used as a physical blowing agent. All of these chemicals were used as they were received without any other purification. The petrosourced polyol is an aromatic polyester polyol obtained from phthalic anhydride (Stepanpol® PS-2412, from Stepan). This polyol is used as a conventional reference and is also called petrosourced polyol in what follows. The biosourced polyester polyol (BASAB) was synthesised from sorbitol according to a protocol described hereinabove PCT/IB2017/055107. The polyester polyol BASAB results from an esterification in two steps between the sorbitol, adipic acid and 1,4-butanediol (1.4 BDO). The first step is the reaction of the sorbitol with two equivalents of adipic acid in relation to sorbitol. The second step consists of the adding of a molar equivalent of 1.4 BDO in relation to the adipic acid. The reaction was carried out in mass without a catalyst at 150° C. This specific process leads to a linear polyester-polyol. The properties of BASAB and of the petrosourced polyol are compared in Table 1.

TABLE 1

Comparison of the properties of the reference petrosourced polyol and of BASAB BASAB

| Polyester Polyol | Hydroxyl value (mg KOH/g) | Acid value (mg KOH/g) | Viscosity (25° C., mPa · s) | Primary hydroxyls | Secondary hydroxyls | Surface tension (mN/m) |
|---|---|---|---|---|---|---|
| Petrosourced polyol | 230-250 | 1.9-2.5 | 4,000 | 2 | 0 | 33.6 ± 0.9 |
| BASAB | 490-510 | Inf. 3 | 14,000 | 2 | 4 | 40 ± 0.8 | b. General Method for Obtaining BASAB

The reaction is carried out in a sealed Stainless steel reactor provided with a U-shaped stirring blade, a Dean Stark having an outlet at the top of the condenser in order to connect thereto a vacuum pump and a bottom outlet for recovering the condensates, an inlet and an outlet of inert gas. In the pure state sorbitol powder and adipic acid are introduced into the reactor in a molar ratio 1/2 (sorbitol/adipic acid). The reactor is placed under inert atmosphere then is launched for heating. When the temperature reaches 100° C., the stirring is progressively started up to 170 rpm. When the temperature reaches 150° C., the reaction is launched and continues for 3 h. After 3 h, 1,4 butanediol (called diol in what follows) is introduced into the reactor in a molar ratio (1,4 butanediol/sorbitol) 2.2/1. The temperature of the reaction medium returns to 150° C. (stirring still maintained at 170 rpm, inert atmosphere). 2 h30 after the return to 150° C. a partial vacuum passage is carried out under a partial vacuum for a duration of one minute then the atmospheric pressure is brought under inert atmosphere. 4 h30 after the adding of diols, a new partial vacuum flush is carried out for 2 minutes then the atmospheric pressure is brought under inert atmosphere. 6 h15 minutes after the introduction of the diol (which is a total reaction time of 9 h15 min at 150° C.), the reactor is stopped and the reaction product is recovered hot in order to have minimum loss during the transfer of material from the reactor to the conditioning of the product.

c. General Method for Preparing PIR Foams

The isocyanate/hydroxyl (NCO/OH) molar ratio was maintained at 3.2 in all the formulations of PIR. To determine the quantity of isocyanate, all the reactive hydroxyl groups are taken into account, i.e. polyols, water and certain solvents used in the composition of the catalysts. A mixture containing polyols, catalysts, a surfactant (PDMS), a flame retardant (TCPP), an expansion agent (isopentane) and water was prepared. In each formulation the quantities (Table 2), of water, TCPP and surfactants were maintained constant at 0.9, 15 and 2.5 parts by weight (pbw), respectively. The total quantity of polyol was maintained at 100 pp. The quantity of expansion agent was adjusted to obtain equivalent bulk densities of foam. The mixture was stirred mechanically until a fine white emulsion was obtained with the incorporation of the expansion agent. The temperatures of the different components were adjusted to 20° C. Then, the correct quantity of polyisocyanate was quickly added using a syringe in the emulsion. The entire reaction mixture was vigorously stirred for 5 s. Then, the foam expands freely in a 250 ml disposable beaker at room temperature (controlled at 20° C.) or in a Foamat. The main characteristic reaction times, i.e. the cream time, the thread time and the tack-free drying time, were recorded. Before a more thorough analysis, the foam samples were stored at room temperature for three days in order to obtain complete structural and dimensional stability, without shrinkage. Certain foams were prepared with a partial substitution of the petrosourced polyester polyols with biosourced polyol, BASAB. The substitution rate was 0 (reference, REF) at 65% by weight. The PIR foams were labelled according to the ratio of petrosourced polyol (% by weight of the polyols)/BASAB (% by weight of the polyols)/EG (% by weight) as REF, PU-90/10/0-KE, PU-75/25/0-KE, PU-65/35/0-KE, PU-55/45/0-KE, PU-45/55/0-KE and PU-35/65/0-KE. The detailed formulations are shown in Table 2.

TABLE 2

Formulation of PIR foams expressed in number of parts

| | | REF | PU-90/10/0-KE | PU-75/25/0-KE | PU-65/35/0-KE | PU-55/45/0-KE | PU-35/65/0-KE |
|---|---|---|---|---|---|---|---|
| Molar ratio | NCO/OH | 3.2 | 3.2 | 3.2 | 3.2 | 3.2 | 3.2 |
| Polyol (pbw) | Petrosourced polyol | 100 | 90 | 75 | 65 | 55 | 35 |
| | BASAB | 0 | 10 | 25 | 35 | 45 | 65 |
| Catalyst (% wt) | KE | 0.12 | 0.12 | 0.12 | 0.12 | 0.12 | 0.12 |
| | Triazine | 0.08 | 0.08 | 0.08 | 0.08 | 0.08 | 0.08 |
| | BDMAEE | 0.03 | 0.03 | 0.03 | 0.03 | 0.03 | 0.03 |
| Surfactant (pbw) | PDMS | 2.5 | 2.5 | 2.5 | 2.5 | 2.5 | 2.5 |
| Flame retardant (pbw) | TCPP | 15 | 15 | 15 | 15 | 15 | 15 |
| Expansion agent (pbw) | Water | 1 | 1 | 1 | 1 | 1 | 1 |
| | Isopentane | 22 | 23 | 25 | 27 | 29 | 32 | d. Characterisations

The thermogravimetric analyses (TGA) were carried out using an instrument from TA: TGA Q5000 at high resolution under reconstituted air (flow rate of 25 mL/min). Samples of 1-3 mg were heated from room temperature to 700° C. (10° C./min). The main characteristic degradation temperatures are those of the maximum of the weight loss curve (DTG) (Tdeg, max) and the characteristic temperatures to which 50% ($T_{deg50\%}$) and 100% ($T_{deg100\%}$) were added.

The infrared spectroscopy was carried out with a Nicolet 380 Fourier transform infrared spectrometer used in reflection mode provided with a diamond module ATR (FTIR-ATR). An atmospheric blank was collected before each sample analysis (64 scans, resolution 4 cm$^{-1}$). All the spectra were standardised on the elongation peak C—H at 2,950 cm-1.

The temperature of the foams, the expansion heights, the flow rates, the bulk density and the pressure were recorded with a Foamat FPM 150 (Messtechnik GmbH) provided with cylindrical recipients 180 mm high and 150 mm in diameter, an ultrasound probe LR 2-40 PFT/a thermocouple of the K type, and a pressure sensor FPM 150. The data was recorded and analysed with specific software.

The closed cell content was determined using a Ultrapyc 1200e from Quantachrome Instruments based on the gas expansion technique (Boyle's Law). Cubic foam samples (of about 2.5×2.5×2.5 cm3) were cut for the first measurement then the samples was again sectioned into eight pieces and the measurements was again taken. The second measurement corrects the closed cell content based on closed cells that were damaged due to the cutting of the sample. The measurements were taken according to standards EN ISO4590 (October 2016) and ASTM 6226 (January 2015).

The fire resistance of the foams was evaluated according to the standardised method EN ISO 11925-2 (February 2013). This flammability test consists of a small exposure to the flame (20 mm high) of a planar sample of foam for 15 s in a combustion chamber with controlled air flow rate. This flammability test is evaluated by measuring the maximum propagation of the flame over the planar surface of the foam. The result of the test is positive if the propagation of the flame stops before reaching 15 cm high on the foam sample.

The morphology of the cells made of foam was observed with an emission scanning electron microscope from Jeol JSM-IT100 (SEM). Cubic foam samples were cut with a microtome blade and analysed according to two characteristic orientations: parallel and perpendicular to the direction of the rising of the foam. By using the ImageJ software (Open Source processing program), the average size of the cells was measured as the aspect ratio of the cells defined by eq. 1.

$$R = \frac{1}{n}\sum_{i=1}^{n}\frac{D_F^{max}}{D_F^{min}}$$

Where $D_{Fmax}$ and $D_{Fmin}$ are maximum and minimum Feret diameters, n is the number of cells measured for a given sample.

The hardness of the foam was measured with a Shore 00 hardness tester from Hilderbrand according to the standard ASTM D 2240 (January 2005). Each sample was tested ten times, the average value of the measurements and the standard deviations were determined.

The quasi-static compression tests were conducted with a Instron compression test machine (E1000, USA), provided with a 1 kN load sensor, at room temperature and at a constant deformation speed of 2.5 mm/min. The cubic samples used for the compression tests have dimensions of 25×25×25 mm³. The samples were tested in the longitudinal direction (corresponding to expansion) and in the transverse direction. The Young's modulus was defined as the slope of the stress-strain curves in the elastic region and the yield strength as the first maximum of the stress curve.

The resistance to compression at 10% deformation (CS (10/Y)) was determined according to the standard EN 826 (May 2013).

The thermal conductivity was measured using the conduction of the heat flow according to the standard EN 12667 (July 2001). Typically, the installation consists of a heating element with two thermocouples in order to determine the temperatures on the front and rear faces. The device is also provided with sensors dedicated to measuring the heating time and the cycle time. The heating and cycle time are used to correct the maximum conduction heat flow, required to determine the thermal conductivity coefficient, using Fourier's Law, used in thermal conduction in the steady state. Plates of different materials, sizes 300×400×3 mm³, were used to determine the thermal conductivity coefficient.

Hansen's solubility parameter is characterised in the following way. A small quantity of polyol was poured into a 5 ml bottle which was then filled with the desired solvent. The bottles were placed in an ultrasonic bath for 1 hour, then the solubility of the polyols was evaluated visually 3 hours later and confirmed after 24 h. The corresponding results (soluble or insoluble) were collected. Hansen's solubility parameters and the predicted compatibility of the two polyols were determined by modelling their solubility sphere with the HSPiP software.

II. Results and Discussion

Hansen's solubility parameters for the petrosourced polyol and BASAB were determined according to a protocol described hereinabove, by qualitatively measuring their dissolutions in fourteen known solvents. Table 3 shows the list of solvents used and their three Hansen parameters (i) the dispersion parameter (δd), (ii) the polar parameter (δp) and (iii) the hydrogen bond parameter (δh). These parameters are used to determine a solubility sphere with the HSPiP software. The solubility score expresses the total solubility of the polyol in the solvent with a score of 1. When the polyol is insoluble or partially soluble, the result obtained is 0.

TABLE 3

Set of solvents used to model the solubility spheres as well as their Hansen parameters and the solubility scores of the BASAB and of the petrosourced polyol

| Solvent | $\delta_d$ | $\delta_p$ | $\delta_h$ | Petrosourced polyol | BASAB |
|---|---|---|---|---|---|
| Dimethyl Sulfoxide (DMSO) | 18.4 | 16.4 | 10.2 | 1 | 1 |
| Tetrahydrofuran (THF) | 16.8 | 5.7 | 8 | 1 | 0 |
| Dimethyl Formamide (DMF) | 17.4 | 13.7 | 11.3 | 1 | 1 |
| p-Xylene | 17.8 | 1 | 3.1 | 0 | 1 |
| Toluene | 18 | 1.4 | 2 | 0 | 0 |
| Pyridine | 19 | 8.8 | 5.9 | 1 | 1 |
| Chloroform | 17.8 | 3.1 | 5.7 | 1 | 0 |
| Methylene Dichloride (Dichloromethane) | 17 | 7.3 | 7.1 | 1 | 0 |
| Ethyl Acetate | 15.8 | 5.3 | 7.2 | 1 | 0 |
| Acetone | 15.5 | 10.4 | 7 | 1 | 0 |
| Ethanol | 15.8 | 8.8 | 19.4 | 1 | 1 |
| 2-Propanol | 15.8 | 6.1 | 16.4 | 0 | 0 |
| Acetic Acid | 14.5 | 8 | 13.5 | 1 | 1 |
| Acetonitrile | 15.3 | 18 | 6.1 | 1 | 0 |
| 1,4-Dioxane | 17.5 | 1.8 | 9 | 1 | 0 |

Before any formulation of substituted foam, the compatibility between the two polyols was studied. The results obtained make it possible to predict the solubility spheres (not shown) of the two polyols according to the three parameters determined by Hansen. It clearly appears that the two spheres largely overlap and that the centres of the spheres are separated by a distance less than their respective radius. Using these observations, it is possible to suppose that the two polyols are compatible and can give rise to the preparation of a stable emulsion before the foaming process.

a. Characteristic Reaction Times and Kinematic Profile of PIR Foams

The petrosourced PIR foam reference (REF) has short reaction times, as shown in Table 4. The characteristic times recorded for the REF were respectively 10, 60 and 148 s for the cream, thread and tack-free drying times. The PIR foam has a typical collar due to the second step of expansion induced by the trimerisation of the isocyanates. This second step is also visible on the Foamat measurements, shown in FIG. 1, b. The expansion speed of the foam starts to decrease after 30 s of reaction and increases again after 60 s of reaction. The temperature curve of the foam (FIG. 1-a) also shows a local plateau at 50 s with an increase up to 150° C., which is linked to the trimerisation of the isocyanates. The same phenomenon is visible in FIG. 1-c. After 50 s, a change in the slope is observed and the standardised height quickly increased from 80 to 100% with the trimerisation of the isocyanates.

TABLE 4

Characteristic foaming times of the foams REF

|  |  | REF |
|---|---|---|
| Characteristics times | Cream time (s) | 10 |
|  | Thread time (s) | 60 |
|  | Tack-free drying time (s) | 148 |

Figure 2:
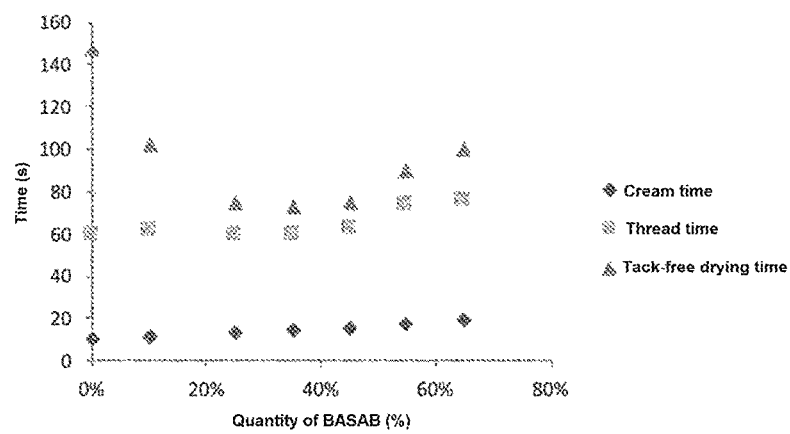
FIG. 2: Change in the characteristic times (cream, thread and tack-free drying) of foaming of PIR foams according to the content of BASAB.

FIG. 2 shows the change in the characteristic cream, thread and tack-free drying times of the foams REF, PU-90/10/0-KE, PU-75/25/0-KE, PU65/35/0-KE, PU-55/45/0-KE, PU-45/55/0-KE and PU-35/65/0-KE plotted as a function of the respective biosourced polyol content of 0%, 10%, 25%, 35%, 45%, 55%, 65%. It can be observed in FIG. 2 that the cream times increase slightly with the increase in the BASAB content. This seems to be linked to the lower reactivity of the secondary hydroxyls of the BASAB. Thread times similar to the REF are observed however for the foams PU-90/10/0-KE to PU-65/35/0-KE. However, the tack-free drying time is subject to variations. It is therefore noted that when the BASAB content increases, the tack-free drying time decreases, and approaches the thread time. This reduction in the interval of time between the thread time and the tack-free drying time indicates that the polymerisation of the polyurethane network of the biosourced foams is improved by the superior functionality of the BASAB. This decrease in the tack-free drying time is a substantial advantage during the method for obtaining a panel with a rigid foam base.

FIG. 1-a shows the temperature of the foam as a function of time. The exothermicity of the reaction between the polyol and the isocyanate is higher for the REF as well as for the foam PU-90/10/0-KE. A progressive decrease in the exothermic nature of the reaction is then observed for higher substitution rates due to the lower reactivity of the secondary hydroxyls of the polyol BASAB. The temperature curves show an inflection point around 70° C. followed by an increase in the temperature for all of the foams observed. This is linked to the exothermicity of the catalysed reaction of trimerisation of the isocyanates and to the formation of the PIR network.

FIG. 1-b shows the expansion profile of the foam. The foaming speed is influenced by the expansion of the gas, it is therefore expected that the change thereof has similarities with the change in the temperature of the foam. The increase in the biosourced polyol content delayed the increase in the temperature and a decelerated the expansion of the foam. Thus, the peak of the foaming speed becomes wider and the maximum thereof decreases from 3.5 (REF) to 1.5 mm/s (PU-35/65/0-KE). The second increase in the foaming speed linked to the trimerisation of the isocyanates is consequently delayed. The change in the standardised height of the foams (H/Hmax) as a function of time is shown in FIG. 1-c. The second increase in the standardised height is linked to the foaming speed and to the trimerisation of the isocyanurate. Up to 35% by weight (PU-65/35/0-KE) of the substitution of biosourced polyol, the standardised height increases linearly. Then, when the trimerisation of the isocyanates occurs, a net change in the trend is observed. For the other samples, the standardised height has a sort of plateau before the inflection, due to the trimerisation delay observed hereinabove on the foaming speed.

b. Closed Cell Content and Morphology of the Foams

Figure 3:
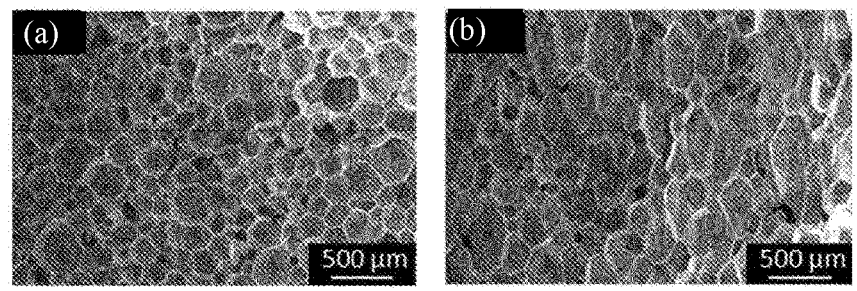
FIG. 3: SEM images of the PIR foam REF, magnification ×40: (a) in the direction transverse to the expansion of the foam, (b) in the direction of the expansion (from the bottom upwards).
Figure 4A:
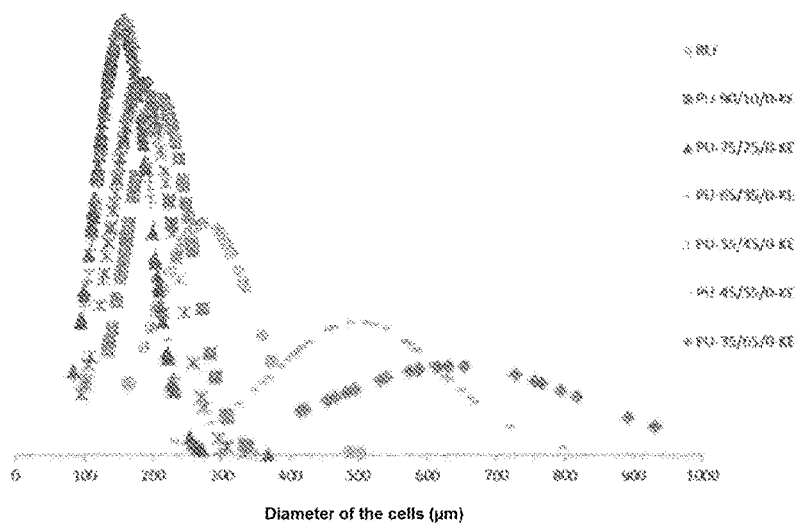
FIG. 4A minimum distribution of the diameter in the transverse direction.
Figure 4B:
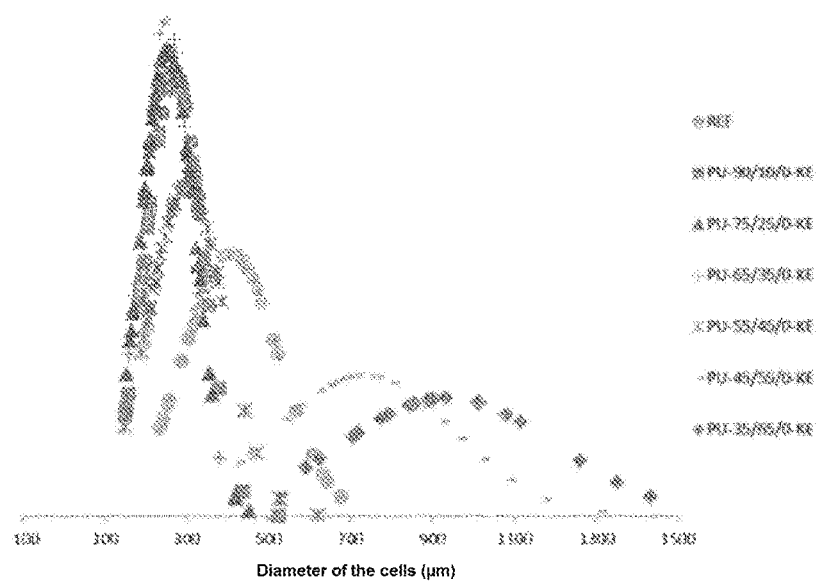
FIG. 4B: distribution of the maximum diameter in the transverse direction.
Figure 4C:
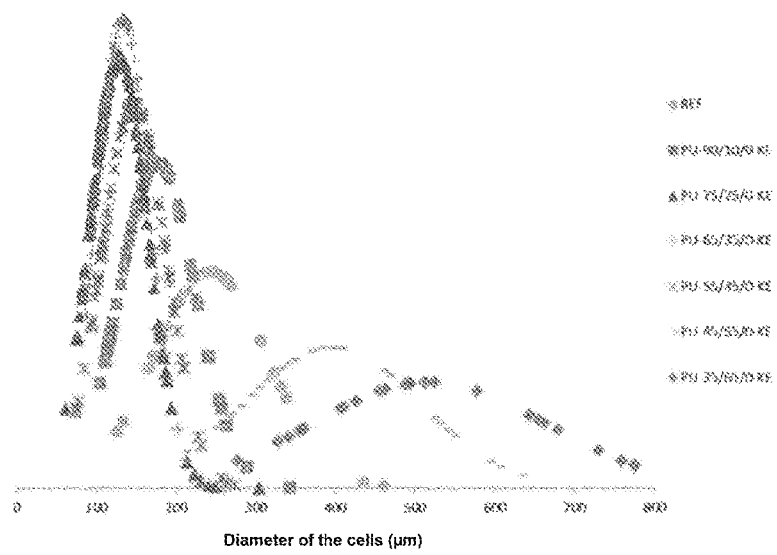
FIG. 4C: minimum distribution of the diameter in the longitudinal direction.
Figure 4D:
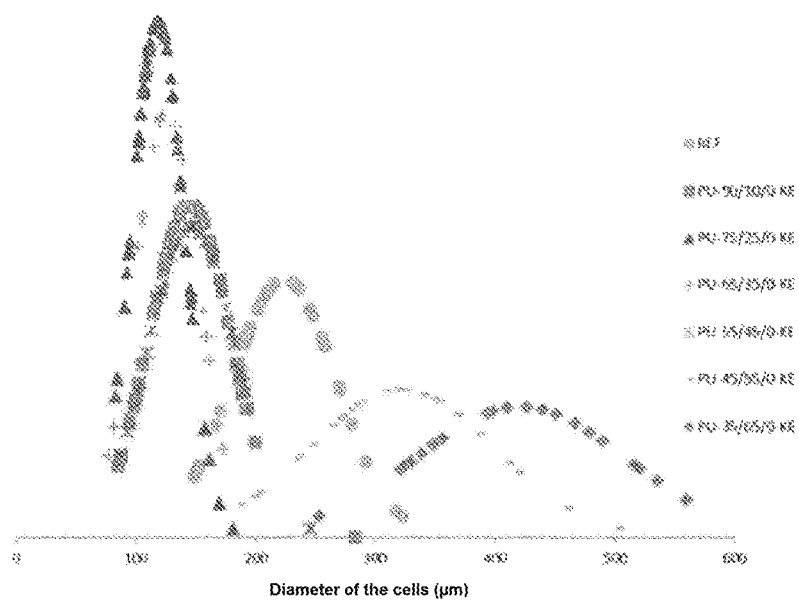
FIG. 4D: distribution of the maximum diameter in the longitudinal direction.
Figure 5:
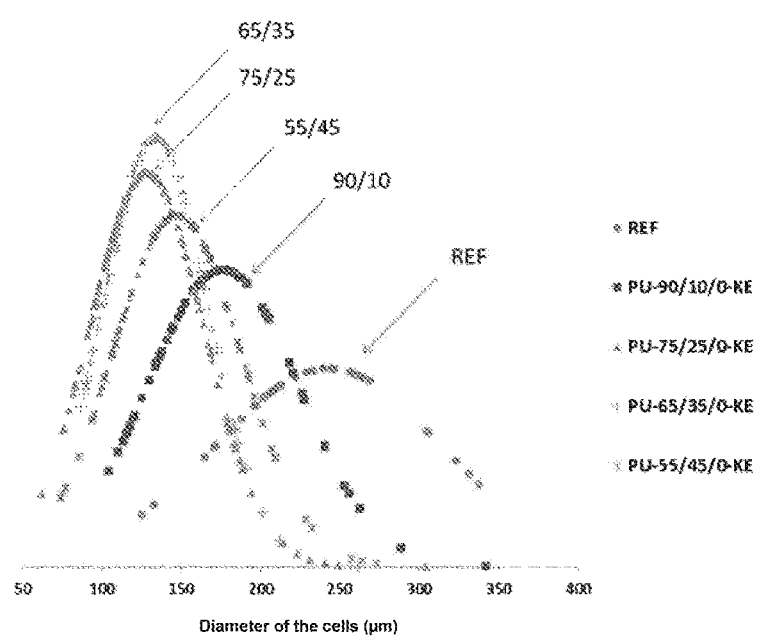
FIG. 5: Distribution of the cell diameters in the direction transverse to the expansion of different PIR foams.
Figure 6A:
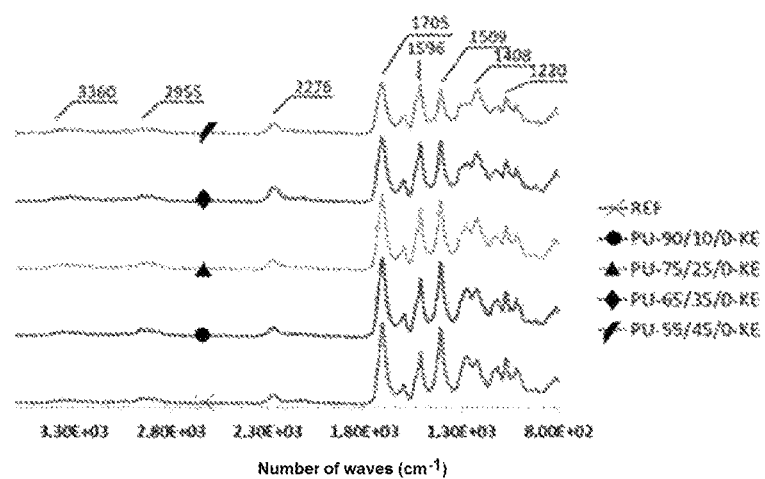
FIG. 6A: REF, PU-90/10/0-KE, PU-75/25/0-KE, PU-65/35/0-KE, PU-55/45/0-KE.
Figure 6B:
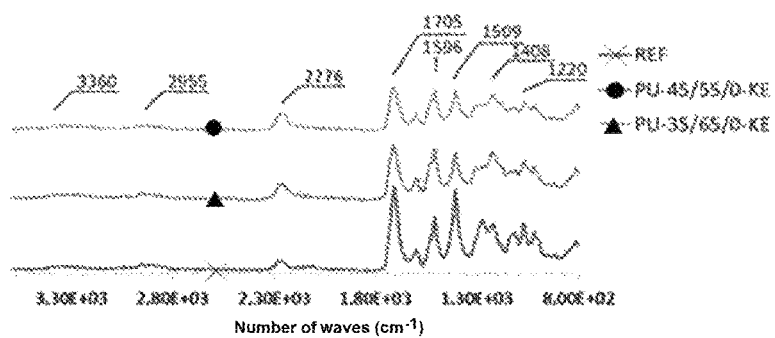
FIG. 6B: Reference, PU-45/55/0-KE, PU-65/35/0-KE.

FIG. 3 shows the SEM images of the foam REF in the transverse and longitudinal directions in relation to the rising of the foam. A typical honeycomb structure in the transverse direction is clearly observed. The stretching of the cells in the longitudinal direction is characteristic of a partially free expansion foaming process carried out in an open cylindrical recipient (Hawkins, M. C., 2005. *J. Cell. Plast.* 41, 267-285). This is actually visible thanks to the anisotropic coefficient R of all the PIR foams shown in Table 5. The coefficients R are close to 2.0 in the longitudinal direction (oval shape), while in the transverse direction, R is close to 1.2 (close to the spherical shape). Surprisingly, the introduction of the polyol BASAB into the formulation has a substantial influence on the size of the cells as observed with electron microscopy (not shown). The observation of the SEM snapshots of all the PIR foams formulated in the direction transverse and longitudinal to the rising of the foam clearly illustrates the decrease in the size of the cells, compared to the reference for foams that have a substitution rate of the petrosourced polyol from 10% to 45%. An inverted trend is observed for the foams PU-45/55/0-KE, PU-35/65/0-KE. The distribution of the maximum and minimum diameters of the cells such as observed in SEM in the transverse and longitudinal directions for the formulated PIR forms is shown in FIG. 4. The distribution of the diameters of the cells follows a normal distribution centred on the average value of the diameter of the cells of the PIR foam concerned. These curves were obtained by measuring a minimum number of one hundred cells per foam in the longitudinal and transverse directions, respectively. The size of the diameter of the cells decreases with respect to the reference for foams PU-90/10/0-KE to PU-55/45/0-KE and has a narrower distribution. Other formulations of foams have higher cell diameters and wider distributions. The minimum size of the diameter of the calls falls from 275 to 155 μm in the transverse direction for PU-75/25/0-KE in relation to REF. The same phenomenon is observed in the longitudinal direction (Table 5). With a substitution of 35 to 45% by weight, the cell size increases in relation to the PIR foam with 25% by weight of substitution. However, foams with 25 to 45% by weight still have cell sizes smaller than REF (Table 5). Above 45% by weight of substitution, the PIR foams (PU-45/55/0-KE, PU-35/65/0-KE) have larger cells compared to REF and this in all directions (Table 5). The lowest temperatures are reached for the foaming of PU-45/55/0-KE, PU-35/65/0-KE (FIG. 1-a). These drops in temperature delay the trimerisation of the isocyanates, and induce lower reaction speeds (for example a longer thread time). The longer reaction times, linked to an slower foam expansion, are at the origin of a strong coalescence before the stabilisation/"setting" of the morphology by complete polymerisation of the network, inducing larger cells. FIG. 4-a,b shows the distribution of the cell size of the PIR foams in the transverse direction for substitution rates of the petrosourced polyester polyol ranging up to PU-55/45/0-KE. The cell size distributions are narrow and the average diameters of the cells decrease progressively with the increase in the BASAB content in the foam up to PU-65/35/0-KE. The PIR foam having a substitution rate of 45% by weight (PU-55/45/0-KE), marks the change in the trend as its diameters of cells increase in relation to PU-65/35/0-KE. FIG. 5 shows the distribution of the cell size of the PIR foams in the transverse directions determined in electron microscopy having smaller average cell sizes than the REF. With respect to the REF, the foams PU-90/10/0-KE to PU-55/45/0-KE also have a narrower cell distribution. Foams with a BASAB content greater than 45% by weight have cells that are larger than REF, in accordance with the change in the trend observed on PU-45/55/0-KE.

TABLE 5

Feret diameters and anisotropy coefficient R in the directions longitudinal and transverse to the expansion of foams

| | | REF | PU-90/10/0-KE | PU-75/25/0-KE | PU-65/35/0-KE | PU-55/45/0-KE | PU-45/55/0-KE | PU-35/65/0-KE |
|---|---|---|---|---|---|---|---|---|
| Longitudinal direction | Max Feret, $D_F^{max}$ (µm) | 408 ± 117 | 269 ± 70 | 254 ± 66 | 251 ± 59 | 301 ± 93 | 728 ± 218 | 938 ± 260 |
| | Min Feret, $D_F^{min}$ (µm) | 223 ± 44 | 145 ± 34 | 118 ± 22 | 126 ± 27 | 147 ± 37 | 320 ± 77 | 421 ± 87 |
| | $R = D_F^{max}/D_F^{min}$ | 1.83 | 1.86 | 2.15 | 2.00 | 2.05 | 2.28 | 2.23 |
| Transverse direction | Max Feret, $D_F^{max}$ (µm) | 275 ± 72 | 208 ± 47 | 155 ± 39 | 158 ± 39 | 183 ± 45 | 495 ± 126 | 643 ± 189 |
| | Min Feret, $D_F^{min}$ (µm) | 242 ± 72 | 176 ± 48 | 128 ± 36 | 134 ± 33 | 147 ± 40 | 392 ± 110 | 518 ± 147 |
| | $R = D_F^{max}/D_F^{min}$ | 1.14 | 1.18 | 1.21 | 1.18 | 1.24 | 1.26 | 1.24 |

The inventors of the present invention consider, without desiring to be limited by a theory, that the surface tension of the BASAB (Table 1) is greater than that of the second petrosourced polyol. This increase slows down the growth of the bubbles according to Laplace's equation (2) because the pressure inside the bubble must exceed the surface tension in order to increase (Minogue, E., 2000. *An in-situ study of the nucleation process of polyurethane rigid foam formation*. Dublin City University).

$$\Delta P = \frac{2\gamma}{r} \quad (2)$$

Where $\Delta P$ is the excess pressure of the bubble gas, $\gamma$ the surface tension and r the radius of the bubble. Then, the largest functionality of BASAB leads to a faster structural organisation of the cell wall by decreasing the thread time, thus preventing the coalescence of cells which would lead to higher cell sizes.

The closed cell content of the foams is shown in Table 7. The REF and PU-90/10/0-KE to PU-65/35/0-KE have closed cell contents greater than 90%. The closed cell content of foam samples PU-55/45/0-KE, PU-45/55/0-KE and PU-35/65/0-KE falls to 87, 47 and 28%, respectively. These foams have lower foaming temperatures and longer reaction times according to the results mentioned hereinabove. This means that the cell walls cannot withstand the expansion of the gas and collapse during the expansion of the foam (Septevani, A. A., Evans, D. A. C., Chaleat, C., Martin, D. J., Annamalai, P. K., 2015. *Ind. Crops Prod*. 66, 16-26). Table 6 displays the Shore 00 hardness data. The Shore 00 hardness results can be divided into two main populations. PU-90/10/0-KE to PU-65/35/0-KE, having values similar to the REF. The Shore 00 hardness results are similar to those of REF for the foams PU-90/10/0-KE to PU-55/45/0-KE manifesting rigidity similar to that of REF. The other foams have a slightly lower Shore 00 hardness indicating a decrease in the rigidity.

TABLE 6

Shore 00 hardness results of PIR foams

| | REF | PU-90/10/0-KE | PU-75/25/0-KE | PU-65/35/0-KE | PU-55/45/0-KE | PU-45/55/0-KE | PU-35/65/0-KE |
|---|---|---|---|---|---|---|---|
| Shore 00 hardness | 72 ± 3 | 71 ± 3 | 71 ± 4 | 73 ± 2 | 65 ± 3 | 56 ± 2 | 43 ± 9 | c. Properties of Foams: Bulk Density, Resistance to Compression, Thermal Conductivity, Chemical Structure (FT-IR), Thermal Stability and Fire Resistance The bulk density values shown in Table 7 are similar for all the PIR formulations, except for samples PU-45/55/0-KE and PU-35/65/0-KE. Since the content in blowing agent is maintained constant in each formulation, the densifications of PU-45/55/0-KE and of PU-35/65/0-KE are linked to their lower foaming reactivity, resulting in lower temperatures which decrease the expansion rate of the blowing agent. The FT-IR spectra of the foams are shown in Figure SI. 6-a, b. All the foams have characteristic peaks, such as the stretching vibration of the N—H groups at 3,400-3,200 cm$^{-1}$ and the stretching vibration C=O at 1,705 cm$^{-1}$ coming from the urethane functions. The signals located at 2,955 cm$^{-1}$ and 2,276 cm$^{-1}$ are respectively attributed to the stretching of the C—H bond of the polyurethane skeleton and of the residual NCO groups that did not react. The signal at 1,596 cm$^{-1}$ corresponds to the Ph-H stretching of the phenyl groups of the pMDI. The flexion signal of the N—H groups is located at 1,509 cm$^{-1}$. The stretching of the C—O bonds is located at 1,220 cm$^{-1}$. The strong signal at 1,408 cm$^{-1}$ is attributed to the isocyanurate rings, typical of PIR foams.

TABLE 7

Properties of PIR foams

| | REF | PU-90/10/0-KE | PU-75/25/0-KE | PU-65/35/0-KE | PU-55/45/0-KE | PU-45/55/0-KE | PU-35/65/0-KE |
|---|---|---|---|---|---|---|---|
| Bulk density (kg/m$^3$) | 31.1 | 30.2 | 32.3 | 32.9 | 32.1 | 36.1 | 39.8 |
| Closed cell content (%) | 95 | 94 | 92 | 92 | 87 | 47 | 28 |

Figure 7:
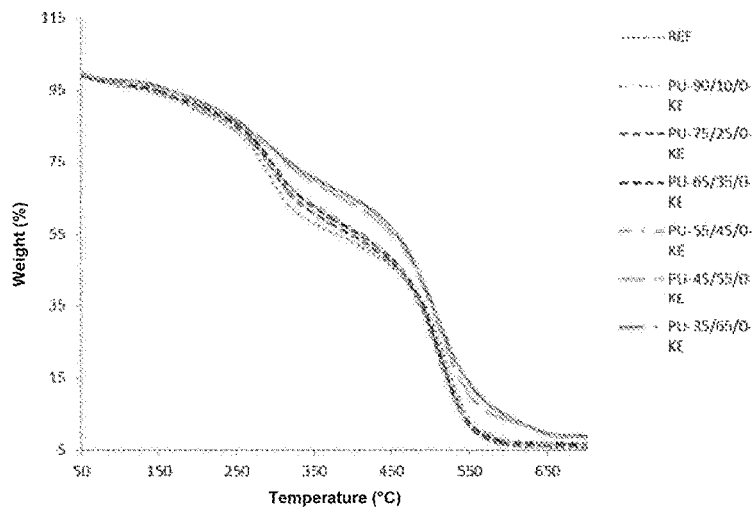
FIG. 7: ATG curves of the PIR foams under reconstituted air.
Figure 8:
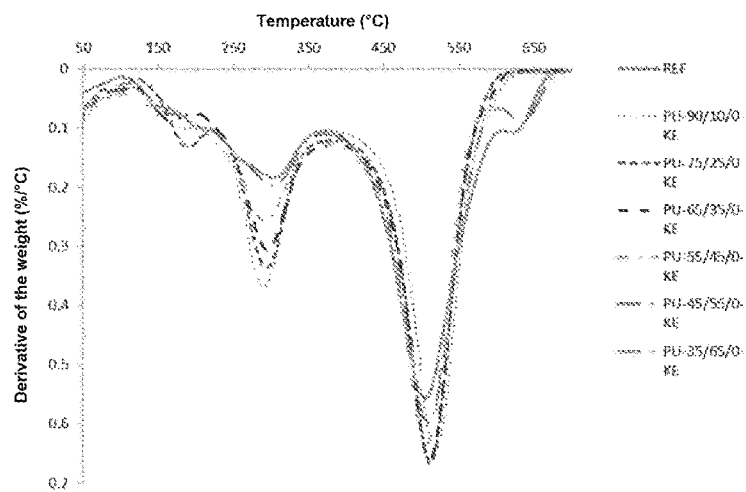
FIG. 8: DTGA curves of the PIR foams under reconstituted air.

The thermal stability of the PIR foam samples was studied by thermogravimetric analysis. FIGS. 7-8 show the TGA and DTG curves of all the PIR foams. All the PIR foams have a conventional weight loss in two steps (Sheridan, J. E., Haines, C. A., 1971. *J. Cell. Plast*. 7, 135-139). The PIR foams with a higher BASAB content (PU-45/55/0-KE, PU-35/65/0-KE) have better thermal stability than the REF. The Table 8 shows the temperatures at the maximum of the curve derived from the weight loss: $T_{deg\ max1}$ and $T_{deg\ max2}$. $T_{deg\ max1}$ are in the range from 200 to 300° C. $T_{deg\ max2}$ is observed around 500° C. for all the substituted PIR foams. $T_{deg\ max1}$ corresponds to the decomposition of the urethane linkage. The decomposition mechanism of the urethane linkage is generally described as three simultaneous processes such that (i) the dissociation of the isocyanate and of the alcohol, (ii) the formation of primary and secondary amines and (iii) the formation of olefins (Javni, I., Petrovi, Z. S., Guo, A., Fuller, R., 2000. *J. Appl. Polym. Sci*. 77, 1723-1734). $T_{deg\ max2}$ is more pronounced than the first $T_{deg\ max1}$ and it is assigned to the double degradation of the isocyanurate and of the cleavage of the carbon bond (Sheridan, J. E., Haines, C. A., 1971. *J. Cell. Plast*. 7, 135-139). The first weight loss is less substantial due to the isocyanurate groups. The isocyanurate groups are more stable thermally than the urethane due to the absence of labile hydrogen and the corresponding degradation is then mainly due to the cleavage of the carbon bond (Sheridan, J. E., Haines, C. A., 1971. *J. Cell. Plast*. 7, 135-139). The Table 8 has two temperatures corresponding respectively to 50% ($T_{deg\ 50\%}$) and 100% ($T_{deg\ 100\%}$) of the weight loss PIR foams. $T_{deg\ 50\%}$ and $T_{deg\ 100\%}$ are similar for all the formulations of PIR foam, except for the sample PIR PU-35/65/

0-KE which have $T_{deg}$ greater than 50% and $T_{deg\ 100\%}$. These two foams have the highest biosourced content. This is in accordance with the TGA and DTG observations hereinabove. All of the PIR foams were subjected to an ignitability test according to standard EN ISO 11925-2 (February 2013) such as described hereinabove. No foam has a sustaining combustion after exposure to a 2 cm flame for 15 s. The maximum heights of the flames never exceeded 15 cm in height before going out. Thus all the PIR foams of the study successfully passed the ignitability test described by standard EN ISO 11925-2 (February 2013). The aromatic petrosourced polyol has an aromatic structure and it is well known that the aromaticity provides a higher resistance to fire, favouring surface carbonisation, which reduces flammability (Celzard, A., Fierro, V., Amaral-Labat, G., Pizzi, A., Torero, J., 2011. *Polym. Degrad. Stab.* 96, 477-482).

TABLE 8

Degradation temperature of PIR foams at 50% and 100% of weight loss

| | ATG | | DTG | |
|---|---|---|---|---|
| | $T_{deg50\%}$ | $T_{deg100\%}$ | | |
| Sample | (° C.) | (° C.) | $T_{deg\ max1}$ | $T_{deg\ max2}$ |
| REF | 448 | 645 | 301 | 523 |
| PU-90/10/0-KE | 425 | 628 | 290 | 519 |
| PU-75/25/0-KE | 432 | 604 | 294 | 512 |
| PU-65/35/0-KE | 440 | 605 | 295 | 511 |
| PU-55/45/0-KE | 437 | 614 | 292 | 507 |
| PU-45/55/0-KE | 466 | 646 | 302 | 509 |
| PU-35/65/0-KE | 473 | 702 | 303 | 505 |

Figure 9:
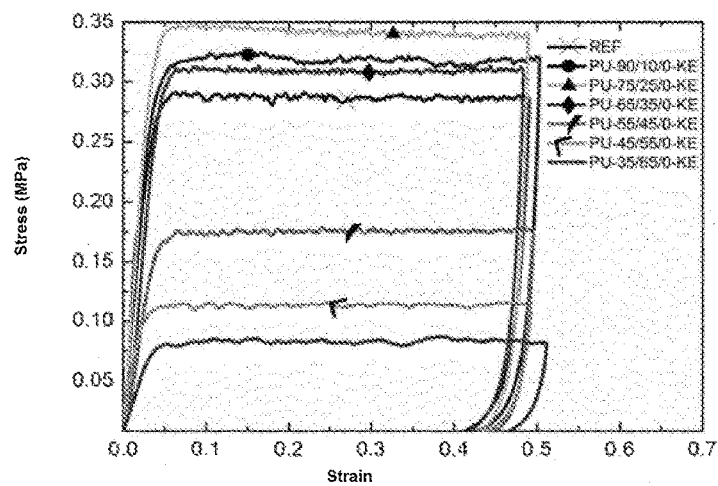
FIG. 9: Stress-strain curves of foams in the longitudinal direction from the REF to PU-35/65/0-KE.
Figure 10:
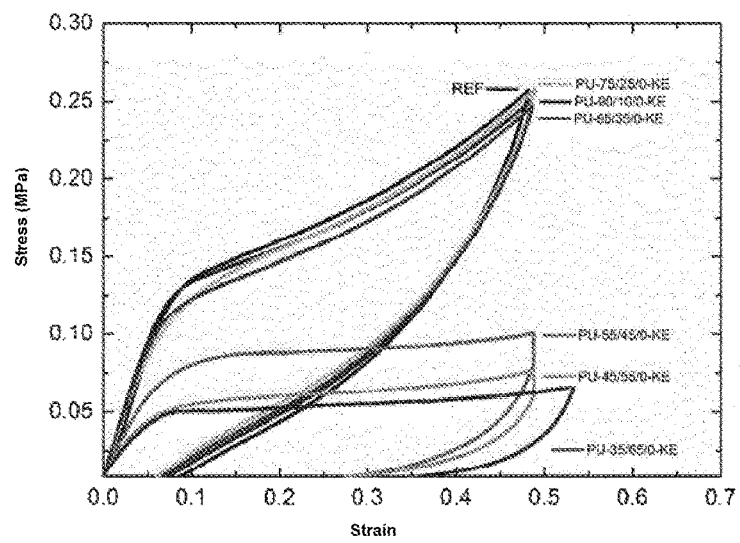
FIG. 10: Stress-strain curves of foams in the transverse direction for the foams REF to PU-35/65/0-KE.

FIGS. 9 and 10 show the stress-strain curves of all the PIR foams, obtained in the longitudinal and transversal directions. As described above, in the longitudinal direction (FIG. 9), the stress increases linearly with the deformation (due to the elastic behaviour of foams), before reaching the elastic threshold. After the elastic limit, the strain remains practically constant due to the collapse of the cells of the foam.

In the transverse direction (FIG. 10), the foam behaves differently. After an elastic portion, up to the elastic limit, the strain continues to increase, corresponding to the densification of the foam. The difference between the behaviours of the foam in the longitudinal and transverse directions is due to the anisotropic nature of the foam. This behaviour was explained well in a preceding work PCT/IB2017/055116. It is confirmed by the ratio of the longitudinal and transversal Young's modulus which decreases from 5.75 to 3.08 for foam samples REF to PU-65/35/0-KE, respectively.

The lowest ratio of Young's modulus of PU-65/35/0-KE reflects the least anisotropic behaviour. This observation is in accordance with the prior results concerning the anisotropic coefficient R of the foam cells (shown in Table 5) because PU-65/35/0-KE has the smallest value of R. In the longitudinal direction, it clearly appears that the mechanical properties, including Young's modulus and the yield strength, presented in Table 9, successively describe two main trends.

The Young's modulus and the yield strength increase first when the concentration in biosourced polyol increased from 0 to 25% by weight (foam samples REF to PU-75/25/0-KE), where a load threshold is reached. Then, a decrease in the mechanical properties is observed for a concentration in biosourced polyol ranging from 35 to 65% by weight.

During the ascending phase of the mechanical properties, the longitudinal Young's modulus increases from 6.9 to 13.5 MPa for the foam samples REF and PU-75/25/0-KE, respectively. This corresponds to an increase in the longitudinal Young's modulus of about 96%.

According to the preceding observations, the mechanical properties follow a similar trend. When the average size of the cells decreases, the distribution of the load is more homogeneous in the foam sample, which gives higher Young's moduli. Then, after the loading of the threshold, with a direct liaison to the architectures of foams, the samples become more fragile due to the polyfunctionality of BASAB. This results in a decreased Young's modulus of about 45%, between PU-65/35/0-KE and PU-35/65/0-KE.

In the transverse direction, a similar and less pronounced change can be observed with an increase in the Young's modulus from 1.2 to 2.9 MPa (Table 9), from foam REF to PU-75/25/0-KE. Then, as in the longitudinal direction, a decrease in Young's modulus is observed from 2.4 to 1.0 MPa from foam PU-65/35/0-KE to foam PU-35/65/0-KE. As mentioned hereinabove, from REF to PU-65/35/0-KE, the foam cell size decreased when the quantity of BASAB increased. This leads to a good distribution of the load, combined with the content of the closed cells, resulting in an increase in performance. The gas enclosed in the cells generates a pressure that resists the compression load, improving the mechanical properties of the foam.

On the other hand, when the content in biosourced polyols increases from 45 to 65% by weight, the content in closed cells decreases significantly. At the same time, the cell size increased and certain defects appear in the morphology of the foam, visible on the SEM snapshots (not shown). All of these factors contribute to losses of mechanical properties.

Figure 11:
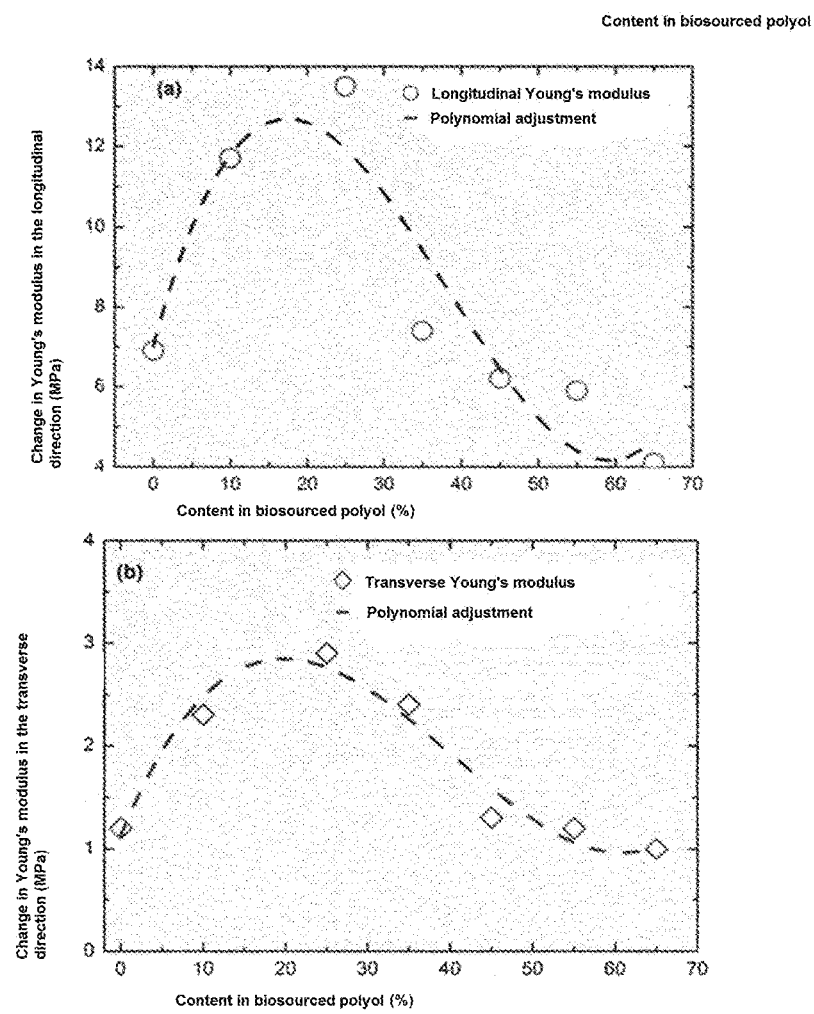
FIG. 11: Change in Young's moduli in the longitudinal (a) and transverse (b) directions according to the content of BASAB.

By adjusting Young's modulus in the longitudinal and transverse directions according to the content of BASAB, it was observed that the change in the Young's modulus can be described by a 3D polynomial adjustment. (FIG. 11). FIG. 11 shows the change in the Young's modulus in the transverse direction (ET) and longitudinal ($E_L$). This change is in accordance with the lower scale established by Gibson and Ashby (L. J. Gibson, M. F. Ashby, Cellular Solids: Structure and Properties, Cambridge University Press, 1997; L. J. Gibson et al., *Failure surfaces for cellular materials under multiaxial loads—I. Modelling, Int. J. Mech. Sci.* 31 (1989) 635-663) to describe the relative density as a function of the ratio between the average cell walls and the cell diameters. $E_L$ and ET are the longitudinal and transverse modules respectively, and $C_{polyol}$ the concentration in polyol, these changes can be given by the following equations 1 and 2:

$$E_{Longi} \times 0.72 C^3_{polyol} - 0.026 C^2_{polyol} + 2.34E - 4C_{polyol} + 7.01 \quad (1)$$

$$E_{Transv} = 0.19 C^3_{polyol} - 0.006 C^2_{polyol} + 5.40E - 5C_{polyol} + 0.23 \quad (2)$$

Contrary to what was observed in the longitudinal direction, the yield strength in the transverse direction decreases continuously when the content in BASAB increases.

Mechanical properties in the transverse direction (FIG. 10), two groups of biosourced foams can be distinguished. The first is comprised of the systems REF, PU-90/10/0-KE, PU-75/25/0-KE and PU-65/35/0-KE, which behaves like the REF, with good recovery. The second comprises PU-55/45/0-KE, PU-45/55/0-KE and PU-35/65/0-KE, which have poor recovery. The latter behaviour could be explained by the fragile nature of these foams because of the high cross-linking structures due to the high-functionality of BASAB.

The results for resistance in compression obtained according to the standard EN 826 (May 2013) has a behaviour similar to the results of quasi-static compression. At 10% strain, foams PU-90/10/0-KE and PU-75/25/0-KE have higher CS(10/Y) than REF. They are therefore more resistant to compression. The other foams have a resistance to compression that decreases with the increase in the BASAB content.

TABLE 9

Mechanical and thermal conductivity parameters of different PIR foams, $E_L$: Young''s modulus in the longitudinal direction, $E_T$: Young's modulus in the transverse direction, $C_L$ Strain value in the longitudinal direction, $C_T$ Strain value in the transverse direction, $\lambda_L$ Coefficient of thermal conductivity in the longitudinal direction, CS(10/Y) Resistance to compression.

| Samples | $E_L$ (MPa) | $C_L$ (MPa) | $E_T$ (MPa) | $C_T$ (MPa) | $E_L/E_T$ | CS(10/Y) (kPa) according to EN 826 | $\lambda_L$ (mw/mK) |
|---|---|---|---|---|---|---|---|
| REF | 6.9 | 0.29 | 1.2 | 0.14 | 5.75 | 298.8 | 24 |
| PU-90/10/0-KE | 11.7 ± 0.1 | 0.28 | 2.3 | 0.12 | 5.09 | 303.5 | 23 |
| PU-75/25/0-KE | 13.5 ± 0.5 | 0.35 | 2.9 | 0.10 | 4.66 | 320.3 | 22 |
| PU-65/35/0-KE | 7.4 ± 0.3 | 0.31 | 2.4 | 0.10 | 3.08 | 281.4 | 23 |
| PU-55/45/0-KE | 6.2 ± 0.10 | 0.17 | 1.3 | 0.08 | 4.77 | 166.2 | 22.5 |
| PU-45/55/0-KE | 5.9 ± 0.4 | 0.11 | 1.2 | 0.05 | 4.91 | 118.1 | 25 |
| PU-35/65/0-KE | 4.1 ± 0.3 | 0.08 | 1.0 ± 0.1 | 0.05 | 4.1 | n.d | n.d |

The thermal conductivity coefficient in the direction longitudinal to the expansion of foams (see Table 9) decreased slightly when the quantity of biosourced polyol increased. The corresponding values are comprised between 22 and 24 mW/(m·K) for REF, PU-90/10/0-KE, PU-75/25/0-KE and PU-65/35/0-KE. The conductivity value of 22 mW/(mK) for foam PU-75/25/0-KE is remarkable. Recently work on rigid PU foams with a sorbitol base has been published, the average conductivity value was 36 mW/(mK) (Ugarte, L., Gómez-Fernández, S., Peña-Rodriuez, C., Prociak, A., Corcuera, M. A., Eceiza, A., 2015. ACS Sustain. Chem. Eng. 3, 3382-3387). The thermal conductivity ($\lambda_t$) of these foams depends on four conductivity coefficients ($\lambda$), namely $\lambda_{gas}$, $\lambda_{PIR}$, $\lambda_{radiation}$ and $\lambda_{convection}$, as described in equation (3). In the PU foams, the conduction in the gas phase represents 65-80% of the heat transfer, while the solid and radiative component represents 20-35%. As these PIR foams are obtained with isopentane and have similar bulk densities as well as a closed cell content that are close, the thermal conductivity is mainly influenced by the decrease in the size of the cells. The smallest cell size influences the extinction coefficient (K) of $\lambda_{radiation}$ expressed by equations (4) and (5) (Hejna, A., Kosmela, P., Kirpluks, M., Cabulis, U., Klein, M., Haponiuk, J., Piszczyk, L., 2017b. J. Polym. Environ, Septevani, A. A., Evans, D. A. C., Chaleat, C., Martin, D. J., Annamalai, P. K., 2015. Ind. Crops Prod. 66, 16-26).

$$\lambda_t = \lambda_{gas} + \lambda_{PUIR} + \lambda_{radiation} + \lambda_{convection} \quad (3)$$

$$\lambda_{radiation} = \frac{16\sigma T^3}{3K} \quad (4)$$

$$K = 4.1 \frac{\sqrt{\frac{\rho_f}{\rho_p}} f_s}{d} \quad (5)$$

$\sigma$ is the Stephan-Boltzmann constant ($5.67*10-8$ W/m$^2$K$^4$), T is the temperature, d is the diameter of the cell, $f_s$ is the fraction of polymer contained in the foams, $\rho_f$ and $\rho_p$ are the foams and the density of the polymer, respectively. Thus, the lower thermal conductivity of the foam sample PU-75/25/0-KE is a consequence of the combined effect of the closed cell content and of the reduction in the cell size in relation to REF. For a content in biosourced polyol comprised between 35 and 45% by weight, the thermal conductivity remains constant around 23 mW/(m×K). Then increases slightly to 25 mW/(m×K) when the content in biosourced polyols reaches 55% by weight. In this particular case, the increase in the thermal conductivity is mainly due to the decrease in the closed cell content and to the increase in the size of the cells. The decrease in the closed cell content substantially affects the value of $\lambda_{gas}$ because the open cells are mainly filled with air which is a less insulating gas than isopentane (Fleurent, H., Thijs, S., 1995. J. Cell. Plast. 31, 580-599).

It has successfully been shown the possibility of adapting the formulation of PIR foam by a method of partial substitution of a petrosourced polyol with a biosourced polyester polyol obtained from sorbitol. The PIR foams have a high content in closed cells (greater than 90%) and a decrease in the average size of the cells of 44% in relation to the petrosourced reference. The characteristics of the cells observed and in particular the presence of fine cells is a key parameter of a foam because they improve the thermal conductivity as well as the mechanical properties of the foam. The partial substitution of a petrosourced polyol with a biosourced polyol allows for the observation of a foam that has increased resistance to compression of 95% as well as reduced thermal conductivity of 2 mW/(mK). Furthermore, for such a foam, a Young's modulus increased respectively by 96 and 142% in the longitudinal and transverse direction is observed when the content in biosourced polyols is optimal. The biosourced PIR foams developed respond to the main required linked to the targeted fields of application (thermal insulation) such as:
  i. good fire resistance,
  ii. mechanical performance,
  iii. low bulk density,
  iv. high content in closed cells,
  v. low thermal conductivity

The invention claimed is:
1. A rigid foam or composition allowing a rigid foam to be obtained made from polyurethane and/or polyisocyanurate, said foam or composition comprising polyols selected from polyester polyols and polyether polyols; said polyols comprising:
   from 5 to 50% of a polyester polyol A by weight relative to the total weight of the polyols; and a polyol B selected from polyester polyols B and polyether polyols B;
   said polyester polyol A being of general formula Rx-Ry-Rz-Ry'-Rx', wherein Rz is a C3 to C8 alcohol sugar selected from glycerol, sorbitol, erythritol, xylitol, arabitol, ribitol, dulcitol, mannitol and volemitol, Ry and Ry' are identical or different diesters of formula

—OOC—C$_n$—COO— with n comprised between 2 and 34, and Rx and Rx' are identical or different C2 to C12 monoalcohols.

2. The rigid foam or composition allowing a rigid foam to be obtained according to claim 1, wherein the mass ratio of polyester polyol A over the polyol B is comprised between 5/95 and 50/50.

3. The rigid foam or composition allowing a rigid foam to be obtained according to claim 1, wherein said polyester polyol A is obtained by:
 a first polycondensation (a) of a C3 to C8 alcohol sugar Z, selected from glycerol, sorbitol, erythritol, xylitol, arabitol, ribitol, dulcitol, mannitol and volemitol; and of two identical or different C4 to C36 diacids Y and Y', and
 a second polycondensation (b) of the product obtained in (a) with two identical or different C2 to C12 diols X and X'.

4. The rigid foam or composition allowing a rigid foam to be obtained according to claim 3, wherein the diacids Y and Y' are independently selected from butanedioic acid, pentanedioic acid, hexanedioic acid, heptanedioic acid, octanedioic acid, nonanedioic acid, decanedioic acid, undecanedioic acid, dodecanedioic acid, tridecanedioic acid, tetradecanedioic acid, pentadecanedioic acid, hexadecanedioic acid, and mixtures thereof.

5. The rigid foam or composition allowing a rigid foam to be obtained according to claim 3, wherein the diols X and X' are independently selected from 1,2-ethanediol, 1,3-propanediol, 1,4-butanediol, 1,6-hexanediol, 1,8-octanediol, 1,10-decanediol, 1,12-dodecanediol, and mixtures thereof.

6. The rigid foam or composition allowing a rigid foam to be obtained according to claim 1, wherein said foam or composition has a cell size with a minimum diameter in the transverse direction comprised between 50 and 350 μm and/or a bulk density comprised between 22 to 60 kg/m$^3$ and/or has a measurement of the lower thermal conductivity coefficient comprised between 18 and 30 mW/(m×K) and/or comprises 5 to 49% of a polyester polyol A by weight relative to the total weight of the polyol.

7. The rigid foam or composition allowing a rigid foam to be obtained according to claim 1, wherein the polyester polyol A has a molecular weight comprised between 350 g/mol and 2,000 g/mol and/or a hydroxyl value from 300 to 900 mg KOH/g and/or a viscosity at 25° C. comprised from 4,000 to 25,000 mPa·s.

8. The rigid foam or composition allowing a rigid foam to be obtained according to claim 1, wherein said foam has a cell size with a minimum diameter in the transverse direction comprised between 50 and 350 μm and/or a bulk density comprised between 22 and 60 kg/m$^3$.

9. The rigid foam or composition allowing a rigid foam to be obtained according to claim 1, wherein said foam comprises at least one reaction catalyst, at least one blowing agent, a stabilizer, at least one polyisocyanate having a functionality at least equal to 2 and, optionally, a flame retardant.

10. The rigid foam or composition allowing a rigid foam to be obtained according to claim 9, said foam being a polyisocyanate foam and comprising:
 60 to 100 parts of polyols of which 5 to 50% by weight of said polyester polyol A on the weight of polyol,
 100 to 700 parts of at least one polyisocyanate,
 0.1 to 13 parts of at least one catalyst,
 0.5 to 80 parts of at least one blowing agent,
 0.2 to 8 parts of a stabilizer, and
 0 to 30 parts of a flame retardant.

11. The rigid foam or composition allowing a rigid foam to be obtained according to claim 10, said foam being a polyisocyanate foam and comprising:
 from 70 to 100 parts of polyols of which 5 to 49% by weight of said polyester polyol A on the weight of polyol,
 from 120 to 650 parts of at least one polyisocyanate,
 from 0.5 to 12 parts of at least two catalysts,
 from 5 to 70 parts of at least one blowing agent,
 from 1 to 7 parts of a stabilizer, and
 from 5 to 25 parts of a flame retardant.

12. The rigid foam or composition allowing a rigid foam to be obtained according to claim 10, said foam being a polyisocyanate foam and comprising:
 between 80 and 100 parts of polyols of which 5 to 49% by weight of said polyester polyol A on the weight of polyol,
 between 150 and 575 parts of at least one polyisocyanate,
 between 1 and 11 parts of at least two catalysts being an amine catalyst and a potassium carboxylate,
 between 10 and 60 parts of at least one blowing agent,
 between 1.5 and 6 parts of a stabilizer, and
 between 10 and 20 parts of a flame retardant.

13. The rigid foam or composition allowing a rigid foam to be obtained according to claim 9, said foam being a polyurethane foam and comprising:
 at least 1 to 100 parts of polyols of which 5 to 50% of said polyester polyol A by weight relative to the total weight of the polyol,
 150 to 500 parts of at least one polyisocyanate,
 0.5 to 5 parts of at least one catalyst,
 0.5 to 15 parts of at least one blowing agent,
 0.2 to 5 parts of a stabilizer, and
 0 to 30 parts of a flame retardant.

14. The rigid foam or composition allowing a rigid foam to be obtained according to claim 13, said foam being a polyurethane foam and comprising:
 from 40 to 100 parts of polyols of which 5 to 49% of said polyester polyol A by weight relative to the total weight of the polyol,
 from 160 to 425 parts of at least one polyisocyanate,
 0.5 to 5 parts of at least one catalyst,
 0.5 to 12 parts of a chemical blowing agent and/or 0 to 60 parts of a physical blowing agent,
 0.2 to 5 parts of a stabilizer, and
 0 to 30 parts of a flame retardant.

15. The rigid foam or composition allowing a rigid foam to be obtained according to claim 13, said foam being a polyurethane foam and comprising:
 between 80 to 100 parts of polyols of which 5 to 49% of said polyester polyol A by weight relative to the total weight of the polyol,
 between 180 and 375 parts of at least one polyisocyanate,
 0.5 to 5 parts of at least one amine catalyst,
 0.6 to 10 parts of a chemical blowing agent and/or 0.5 to 30 parts of a physical blowing agent,
 0.2 to 5 parts of a stabilizer being a polyether-polysiloxane copolymer, and
 0 to 30 parts of a flame retardant.

16. The rigid foam or composition allowing a rigid foam to be obtained according to claim 1, wherein the polyol B has a hydroxyl value comprised between 80 and 800 mg KOH/g and/or a functionality greater than or equal to 2, and/or a molar mass (Mn) comprised between 50 and 4,000 g/mol and/or an acid value less than 10 mg KOH/g and/or a viscosity less than 50,000 mPa·s at 25° C.

17. The rigid foam or composition allowing a rigid foam to be obtained according to claim 9, wherein:
- the at least one polyisocyanate is selected from toluene diisocyanate, 4,4'-diphenylmethane diisocyanate, polymethylene polyphenylene polyisocyanate and mixtures thereof; and/or
- the at least one catalyst is selected from at least one tertiary amine, at least one potassium carboxylate and at least one triazine and mixtures thereof; and/or
- the at least one blowing agent is selected from chemical blowing agents selected from water, formic acid, phthalic anhydride and acetic acid and/or physical blowing agents selected from pentane, isomers of pentane, hydrocarbons, hydrofluorocarbons, hydrochlorofluoroolefins, hydrofluoro-olefins, ethers and mixtures thereof; and/or
- the at least one stabilizer is selected from silicone glycol copolymers, non-hydrolysable silicone glycol copolymer, polyalkylene siloxane copolymer, methylsiloxane polyoxyalkylene copolymer, polyether-polysiloxane copolymer, polydimethylsiloxane polyether copolymer, polyethersiloxane, a polyether-poly siloxane copolymer, a polysiloxane-polyoxyalkylene block copolymer or mixtures thereof; and/or
- the at least one flame retardant is selected from Tris (1-chloro-2-propyl) phosphate, triethylene phosphate, triaryl phosphate esters, ammonium polyphosphate, red phosphorus, trishalogenaryl, and mixtures thereof.

18. The rigid foam or composition allowing a rigid foam to be obtained according to claim 17, wherein the at least one catalyst is selected from N, N-dimethylcyclohexylamine, bis(2-dimethylaminoethyl) ether, 1,3,5-tris(3-[dimethylamino] propyl)-hexahydro-s-triazine, potassium 2-ethylhexanoate and mixtures thereof.

19. A panel or a block of rigid foam comprising a rigid foam according to claim 1.

20. A method of thermal or cryogenic insulation or a method for filling, waterproofing, sealing or improving the buoyancy of an object or of a building by the depositing or the introduction of panels or blocks of rigid foam according to claim 19.

21. A method of thermal or cryogenic insulation or a method for filling, waterproofing, sealing or improving the buoyancy of an object or of a building by the projection in situ of a rigid foam or composition allowing a rigid foam to be obtained according to claim 1.

* * * * *